(12) United States Patent
Kobayashi et al.

(10) Patent No.: US 9,608,505 B2
(45) Date of Patent: Mar. 28, 2017

(54) LINEAR POWER GENERATOR

(71) Applicant: Takaitsu Kobayashi, Chiba (JP)

(72) Inventors: Takaitsu Kobayashi, Chiba (JP); Sanshiro Ogino, Tokyo (JP)

(73) Assignee: Takaitsu Kobayashi, Chiba (JP)

( * ) Notice: Subject to any disclaimer, the term of this patent is extended or adjusted under 35 U.S.C. 154(b) by 398 days.

(21) Appl. No.: 14/376,505

(22) PCT Filed: Dec. 20, 2012

(86) PCT No.: PCT/JP2012/083020
§ 371 (c)(1),
(2) Date: Aug. 4, 2014

(87) PCT Pub. No.: WO2013/118403
PCT Pub. Date: Aug. 15, 2013

(65) Prior Publication Data
US 2014/0375149 A1    Dec. 25, 2014

(30) Foreign Application Priority Data

Feb. 10, 2012  (JP) .................................. 2012-027165

(51) Int. Cl.
*H02K 35/00* (2006.01)
*H02K 35/02* (2006.01)
(Continued)

(52) U.S. Cl.
CPC ............... *H02K 35/02* (2013.01); *H02K 1/34* (2013.01); *H02K 7/1876* (2013.01);
(Continued)

(58) Field of Classification Search
CPC ........ H02K 35/00; H02K 35/02; H02K 35/04; H02K 35/06; H02K 7/1869; H02K 7/1876;
(Continued)

(56) References Cited

U.S. PATENT DOCUMENTS 4,920,292 A * 4/1990 Albrecht ................ H02K 7/125
                                                             310/114
7,898,135 B2 * 3/2011 Flynn .................... H02K 19/103
                                                             310/152
(Continued)

FOREIGN PATENT DOCUMENTS

JP    10-341564    12/1998
JP    11-262234    9/1999
(Continued)

OTHER PUBLICATIONS

International Search Report issued Feb. 12, 2013 in International (PCT) Application No. PCT/JP2012/083020.

*Primary Examiner* — Joshua Benitez Rosario
*Assistant Examiner* — Alexander Singh
(74) *Attorney, Agent, or Firm* — Wenderoth, Lind & Ponack, L.L.P.

(57) ABSTRACT

A linear power generator includes a columnar or cylindrical center yoke made of a soft magnetic material and an outer yoke made of a soft magnetic material. In the center yoke, rod-shaped permanent magnets magnetized in a circumferential direction are arranged in the circumferential direction in an outer circumference of the center yoke such that opposed magnetic poles of the permanent magnets adjacent to each other become identical, the permanent magnets are extended in an axial direction, and the center yoke includes plural center-side projecting portions linearly arranged in the circumferential direction. The cylindrical or columnar outer yoke includes plural winding portions, plural groove portions, and an outer-side projecting portion. The winding portions are arranged in the circumferential direction about a center axis. The groove portions are arranged at positions opposed to the permanent magnets.

4 Claims, 17 Drawing Sheets

(51) Int. Cl.
  *H02K 41/02* (2006.01)
  *H02K 41/00* (2006.01)
  *H02K 1/34* (2006.01)
  *H02K 41/03* (2006.01)
  *H02K 7/18* (2006.01)
  *H02K 35/06* (2006.01)

(52) U.S. Cl.
  CPC .............. *H02K 35/00* (2013.01); *H02K 41/00* (2013.01); *H02K 41/02* (2013.01); *H02K 41/031* (2013.01); *H02K 35/06* (2013.01); *H02K 2207/03* (2013.01)

(58) Field of Classification Search
  CPC ........ H02K 7/1892; H02K 1/34; H02K 41/00; H02K 41/02; H02K 41/03; H02K 41/031; H02K 41/033; H02K 1/17; H02K 21/04; H02K 21/042; H02K 21/38; H02K 2207/03

USPC ......... 310/12.12, 12.04, 12.18, 12.21, 12.22, 310/12.24, 12.26, 181
  See application file for complete search history.

(56) References Cited

U.S. PATENT DOCUMENTS

| | | |
|---|---|---|
| 2002/0175580 A1 | 11/2002 | Ogino |
| 2007/0040384 A1 | 2/2007 | Bernhoff et al. |
| 2010/0277012 A1 | 11/2010 | Kobayashi |

FOREIGN PATENT DOCUMENTS

| | | |
|---|---|---|
| JP | 2000-341921 | 12/2000 |
| JP | 2001-327145 | 11/2001 |
| JP | 2002-175913 | 6/2002 |
| JP | 2006-101695 | 4/2006 |
| JP | 2006-523800 | 10/2006 |
| JP | 2009-189185 | 8/2009 |

* cited by examiner

LINEAR POWER GENERATOR

TECHNICAL FIELD

The present invention relates to linear power generator.

BACKGROUND ART

There is an oscillation power generator (or reciprocating power generator) that converts kinetic energy of a reciprocating permanent magnet into electric energy (for example, see Patent Literature 1). In the description, the oscillation power generator (or reciprocating power generator) is referred to as a linear power generator. The linear power generator includes a reciprocating (oscillating) center yoke corresponding to a rotor of a rotary power generator and an outer yoke corresponding to a stator of the rotary power generator. Generally, a winding portion (coil portion) is provided on an outer yoke side, a permanent magnet is provided on a center yoke side, and power generated in the winding portion by reciprocating motion of the center yoke in the fixed outer yoke is taken out. In the rotary power generator, a technology of constraining cogging is frequently used in order to obtain a smooth motion of a rotating shaft (for example, see Patent Literature 2).

CITATION LIST

Patent Literature

Patent Literature 1: JP 11-262234 A
Patent Literature 2: JP 2006-101695 A

SUMMARY OF INVENTION

Technical Problem

Conventionally, although the cogging is constrained in the rotary power generator, the cogging is not constrained in order to obtain the smooth motion of the rotating shaft in the linear power generator. However, even in the linear power generator, the cogging is undesirable from the viewpoint of efficient power generation, because the cogging becomes a force that prevents the reciprocating motion of the center yoke.

An object of the invention is to provide a linear power generator in which the cogging can sufficiently be constrained.

Solution to Problem

According to one aspect of the invention, a linear power generator includes: a columnar or cylindrical center yoke that is made of a soft magnetic material, plural rod-shaped permanent magnets magnetized in a circumferential direction being arranged in the circumferential direction in an outer circumference of the columnar or cylindrical center yoke such that opposed magnetic poles of the permanent magnets adjacent to each other become identical, the permanent magnet being extended in an axial direction, the center yoke including plural center-side projecting portions linearly arranged in the circumferential direction; and a cylindrical or columnar outer yoke that is made of a soft magnetic material, the outer yoke including plural winding portions that are arranged in the circumferential direction about a center axis, plural groove portions that are arranged at positions opposed to the permanent magnets, and an outer-side projecting portion that is arranged while opposed to the center-side projecting portion, the outer-side projecting portion being deviated from the center-side projecting portion by a half pitch, the groove portion being pinched by the outer-side projecting portion in the circumferential direction.

According to another aspect of the invention, a linear power generator includes: a columnar or cylindrical center yoke, plural rod-shaped permanent magnets magnetized in a circumferential direction being arranged in the circumferential direction in an outer circumference of the columnar or cylindrical center yoke such that opposed magnetic poles of the permanent magnets adjacent to each other become identical, the permanent magnet being extended in an axial direction, the center yoke including plural center-side projecting portions arranged in the circumferential direction, mounting positions of the center-side projecting portions between which the permanent magnet is sandwiched being deviated from each other in the axial direction by a half pitch; and a cylindrical or columnar outer yoke including plural winding portions that are arranged in the circumferential direction about a center axis, plural groove portions that are arranged at positions opposed to the permanent magnets, and an outer-side projecting portion that is linearly arranged in the circumferential direction while opposed to the center-side projecting portion, the groove portion being pinched by the outer-side projecting portion in the circumferential direction.

In the linear power generator, a permanent magnet may be arranged in the groove portion along the axial direction, and magnetized so as to have a polarity opposite to the opposed permanent magnet of the center yoke.

Advantageous Effect of Invention

According to the invention, the linear power generator in which the cogging is sufficiently constrained can be constructed.

DESCRIPTION OF EMBODIMENT

An exemplary embodiment of the invention will be described below with reference to the drawings. Hereinafter, a magnetic flux is a flux of magnetic force lines, and a magnetic path is a way of the magnetic force line. The description that the magnetic path is formed by the magnetic flux may be replaced with the description that the magnetic path is formed by the magnetic force line. Hereinafter, a "linear power generator" is simply referred to as a "power generator".

Figure 1:
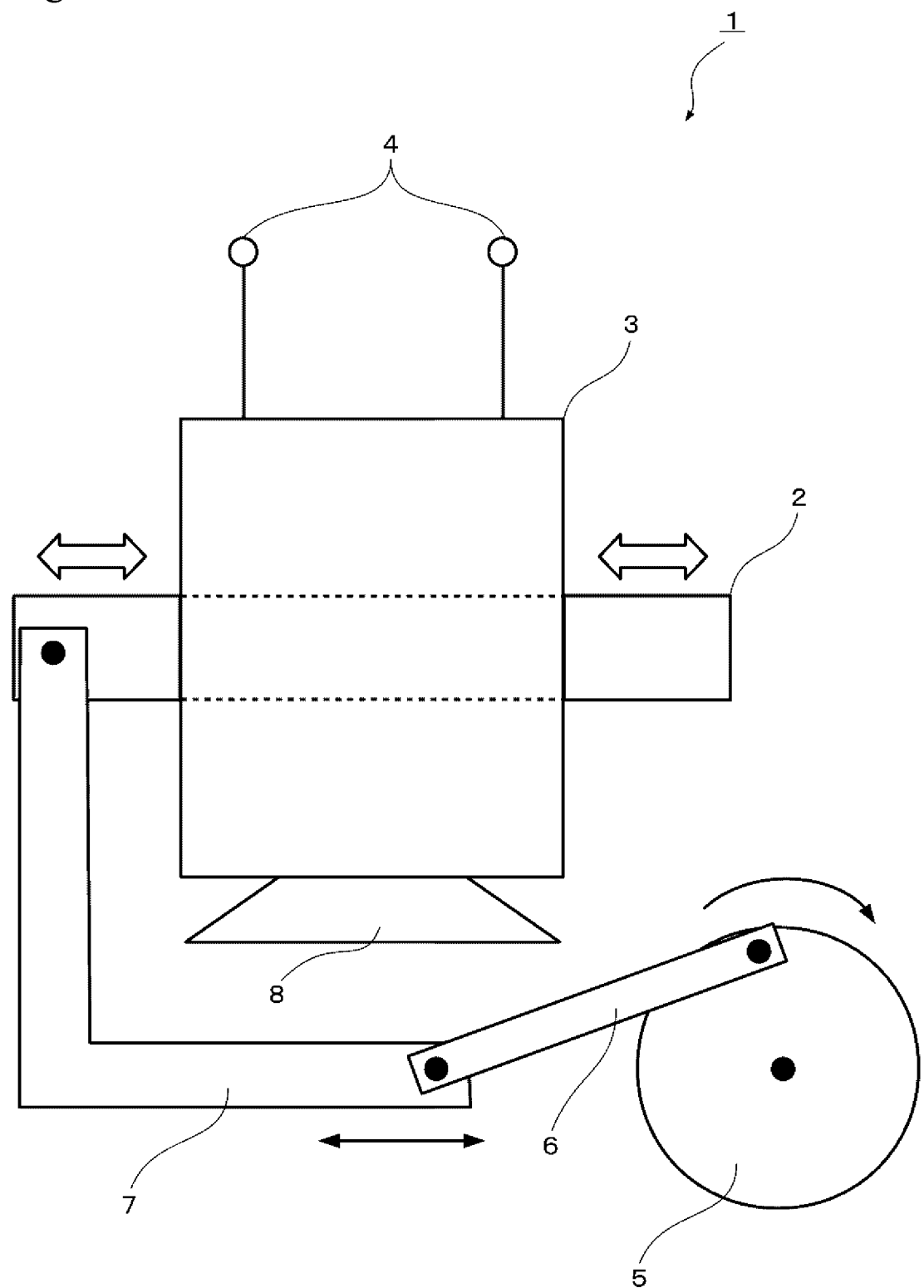
FIG. 1 is a view illustrating a configuration of a power generator in which a linear power generator according to an embodiment of the invention is used.

As illustrated in FIG. 1, a power generator 1 according to an embodiment of the invention includes a center yoke 2, an outer yoke 3, and an output terminal 4 that outputs generated power as an appearance configuration. The power generator 1 generates the power by reciprocating (oscillating) the center yoke 2 in the outer yoke 3. For example, the center yoke 2 is configured to be reciprocated by an arm 7 that is coupled to a disc 5 rotated by an engine with a coupler 6. The outer yoke 3 is fixed to a base 8. Hereinafter, an axial direction means a vertical direction (horizontal direction in FIG. 1) of the center yoke 2 or the outer yoke 3, and a circumferential direction means a circumferential direction about an axial direction and a direction along an outer circumference of the center yoke 2 or the outer yoke 3.

Figure 2:
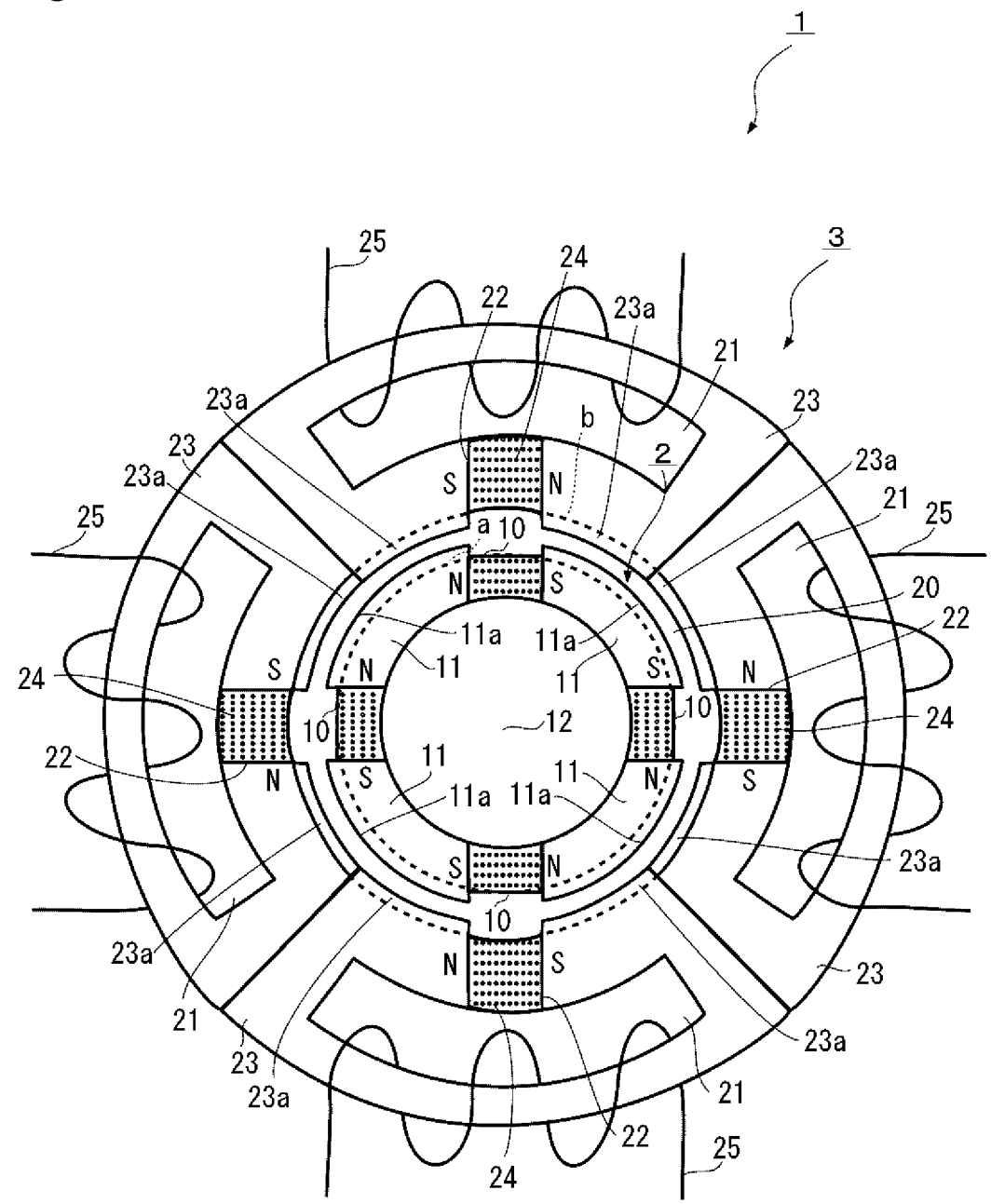
FIG. 2 is a view illustrating a center yoke and an outer yoke of the linear power generator of the embodiment when the center yoke and the outer yoke are viewed in an axial direction (oscillation direction).
Figure 3:
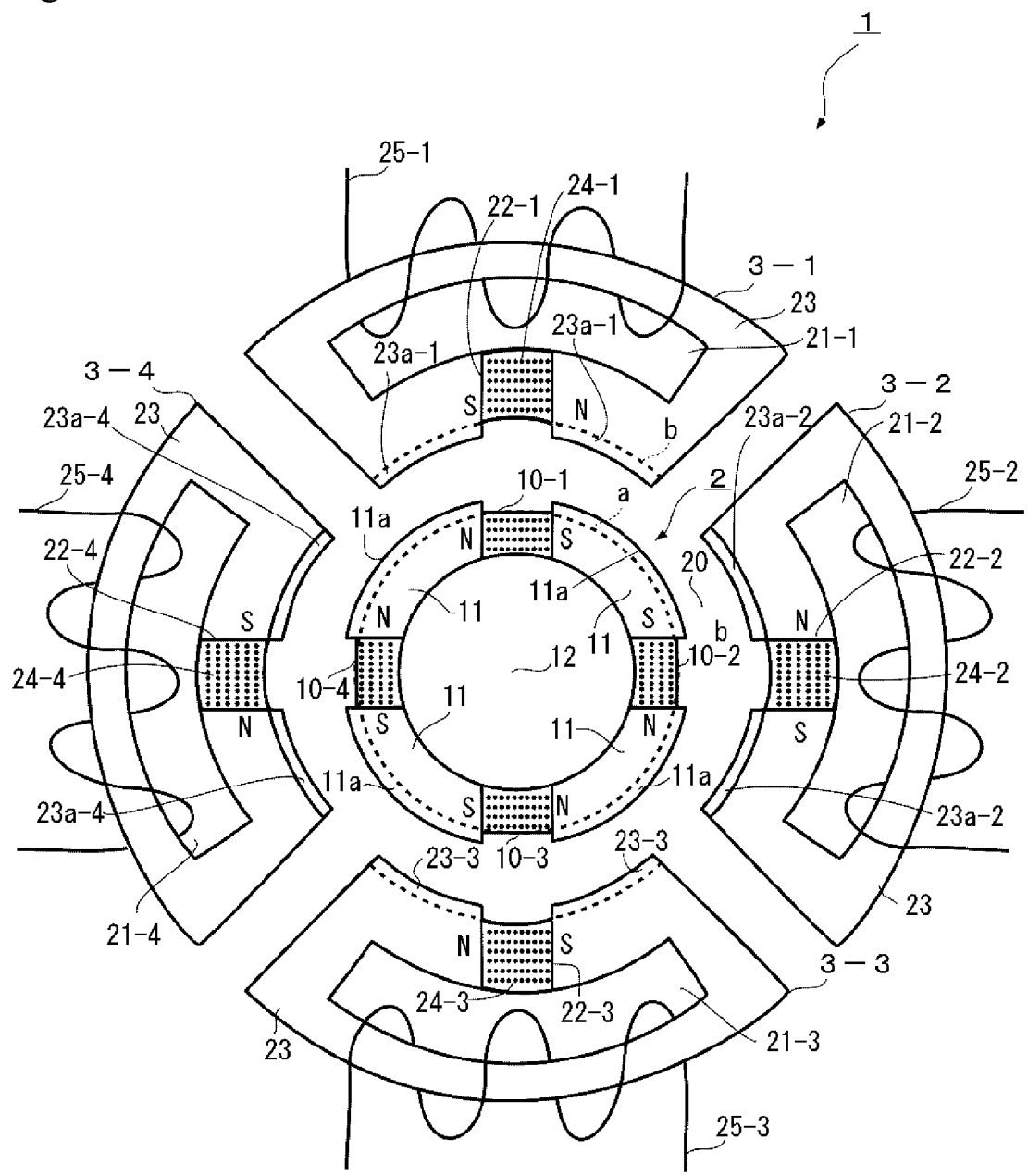
FIG. 3 is a view illustrating components of the center yoke and the outer yoke of the linear power generator in FIG. 2 while the components are divided from one another.

FIG. 2 is a view illustrating the center yoke 2 and the outer yoke 3 of the power generator 1 when the center yoke 2 and the outer yoke 3 are viewed in the axial direction (oscillation direction). On the other hand, FIG. 3 illustrates components of the center yoke 2 and the outer yoke 3 of the power generator 1 in FIG. 2 while the components are divided from one another. Regardless of whether the center yoke 2 and the outer yoke 3 are able to be actually divided, the divided state in FIG. 3 illustrates how to divide when the components of the center yoke 2 and the outer yoke 3 are easily understood for the sake of convenience. For example, the outer yoke 3 in FIG. 2 is divided into outer yokes 3-1, 3-2, 3-3, and 3-4 in FIG. 3. At this point, actually the outer yoke 3 is integrally molded, but cannot be divided. For the sake of convenience, occasionally a branch number (for example, outer yokes 3-1, 3-2, 3-3, and 3-4) is added to the numeral (for example, outer yoke 3) of each member. Additionally, when four permanent magnets 10 of the center yoke 2 can easily be understood while divided from one another, the four permanent magnets 10 are expressed by permanent magnets 10-1 to 10-4 while corresponding to permanent magnets 24-1 to 24-4 of the opposed outer yokes 3-1 to 3-4.

Figure 4:
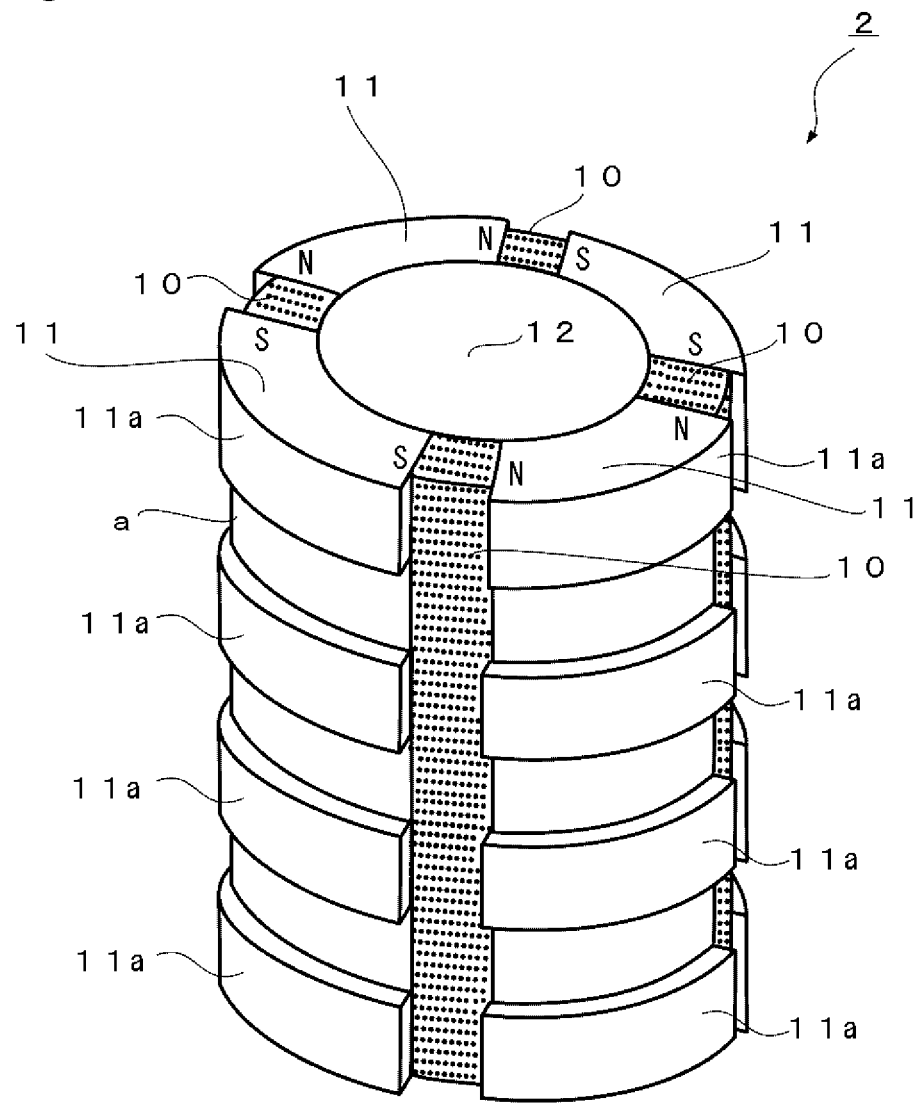
FIG. 4 is a perspective view illustrating the center yoke of the linear power generator in FIGS. 2 and 3.
Figure 4:

As illustrated in FIGS. 2 and 4, the center yoke 2 of the power generator 1 includes a permanent magnet 10 and a center core 11, and is formed into a cylindrical shape. That is, the center yoke 2 includes the center core 11 made of a soft magnetic material and plural rod-shaped permanent magnets 10 that are magnetized in the circumferential direction about the axial direction so as to be exposed to a columnar outer circumference a. The plural permanent magnets 10 are arranged at equal intervals in the circumferential direction of the center yoke 2. In the embodiment, the four permanent magnets 10 are arranged. The permanent magnet 10 is arranged such that a magnetic pole and an opposed magnetic pole of the adjacent permanent magnet 10 become identical. The center yoke 2 includes the plural center cores 11 that are arranged at equal intervals in the circumferential direction when viewed from the axial direction. Each center core 11 includes plural center-side projecting portions 11a. The center-side projecting portions 11a are formed along the circumferential direction while arranged in parallel at equal intervals with respect to the axial direction, and the center-side projecting portions 11a project radially outward from the outer circumference a. The center yoke 2 also includes a hollow portion 12 in a center portion. The hollow portion 12 is provided to reduce a mass of the center yoke 2 for the purpose of efficient reciprocating motion. Accordingly, preferably the hollow portion 12 is used as a hollow. Alternatively, the hollow portion 12 may be filled with light metal such as aluminum or a light-weight and non-magnetic material such as a synthetic resin.

As illustrated in FIG. 2, the outer yoke 3 of the power generator 1 includes a through-hole 20 that is pierced by the center yoke 2. The outer yoke 3 has cylindrical shape and includes plural non-magnetic material portions 21 made of a soft magnetic material. The non-magnetic material portions 21 are formed along the axial direction, and arranged at an equal angle about a shaft. In the embodiment, the non-magnetic material portion 21 becomes a hollow portion. The outer yoke 3 includes plural groove portions 22 from an inner circumference b to the non-magnetic material portion 21. The outer yoke 3 also includes plural outer cores 23 and plural outer-side projecting portions 23a. In the embodiment, the outer cores 23 made of a soft magnetic material are divided into four when viewed from the axial direction. The outer-side projecting portions 23a are arranged in parallel at equal intervals in the axial direction while opposed to the center-side projecting portion 11a of the center yoke 2. The outer-side projecting portions 23a are formed along the circumferential direction, and project radially inward from the inner circumference b. The formation of the center-side projecting portion 11a and the outer-side projecting portion 23a can enhance a density of a magnetic flux to increase an attractive force.

The outer-side projecting portion 23a in FIG. 2 is arranged at a circumferential midpoint between groove portions 22 adjacent to each other while deviated by a half pitch. That is, when the outer yoke 3 is divided into the outer yokes 3-1, 3-2, 3-3, and 3-4 as illustrated in FIG. 3, positions of the outer-side projecting portions 23a-1 and 23a-3 (for example, type A) of the outer yokes 3-1 and 3-3 and positions of the outer-side projecting portions 23a-2 and 23a-4 (for example, type B) of the outer yokes 3-2 and 3-4 are deviated from each other by the half pitch when viewed in the axial direction.

Figure 5:
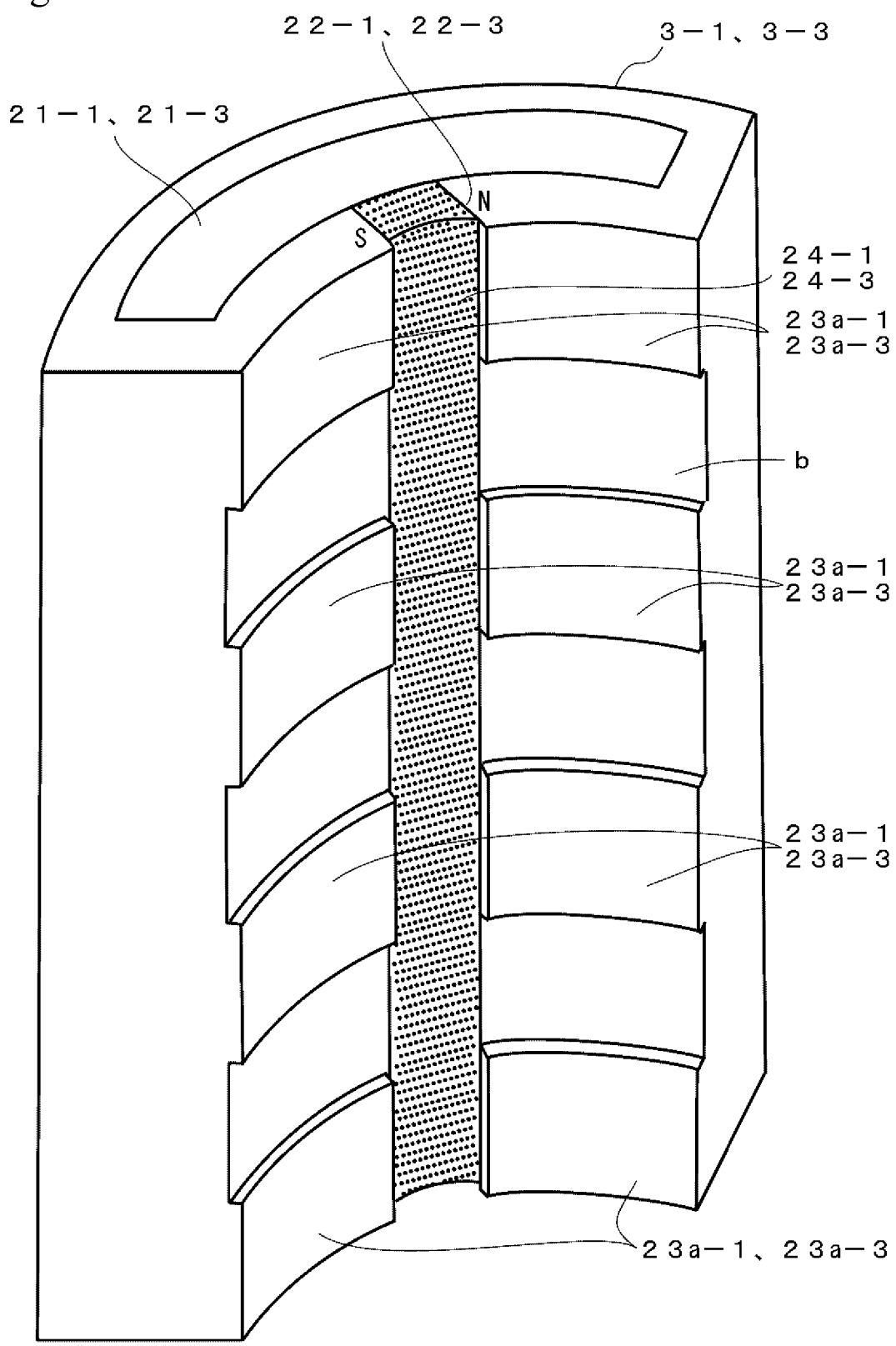
FIG. 5 is a perspective view illustrating a type A that is a part of the center yoke of the linear power generator in FIGS. 2 and 3.
Figure 6:
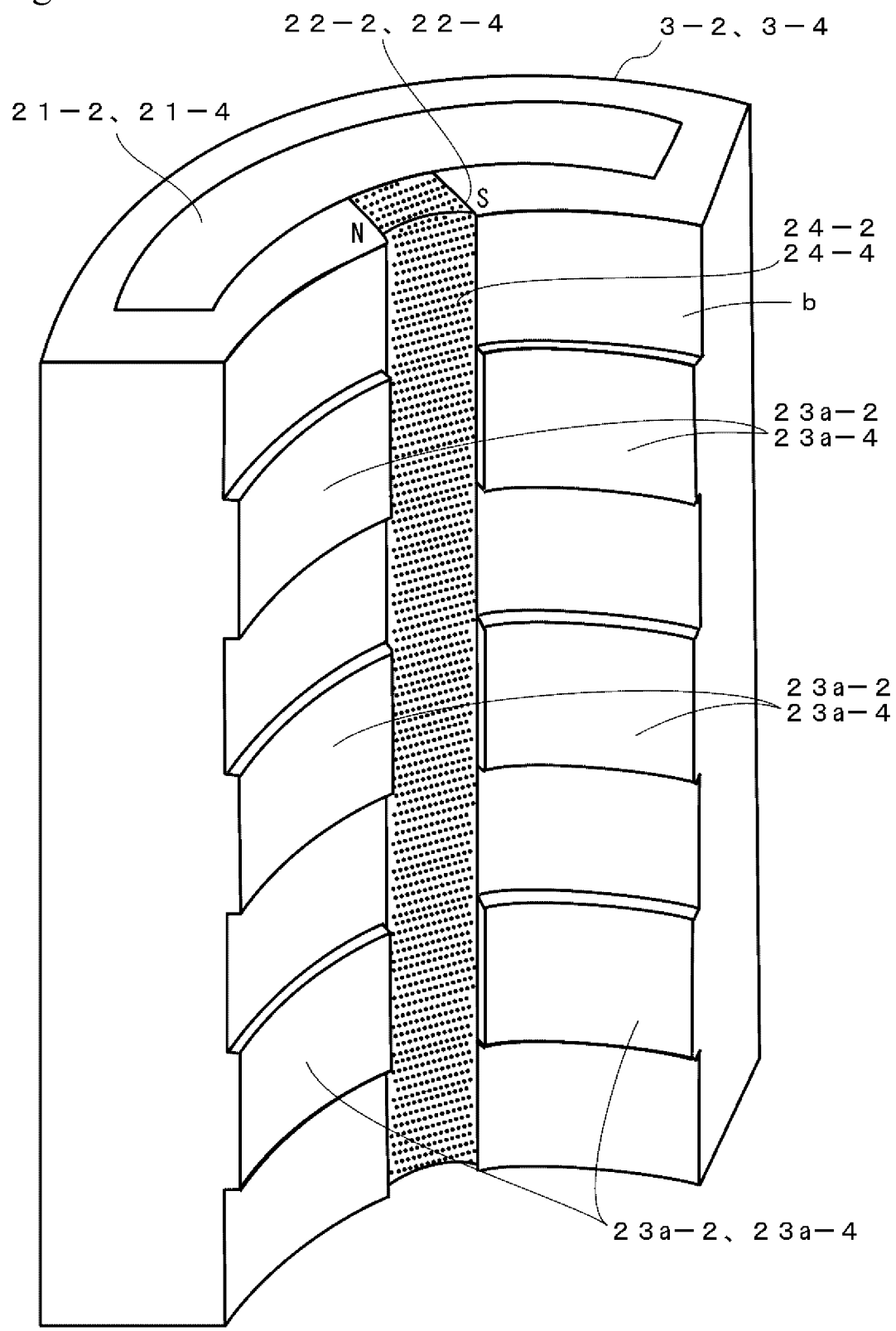
FIG. 6 is a perspective view illustrating a type B that is a part of the outer yoke of the linear power generator in FIGS. 2 and 3.

The state in which the positions of the outer-side projecting portions 23a are deviated from each other by the half pitch in the axial direction will be described in detail with reference to FIGS. 5 and 6. FIG. 5 is a perspective view of the outer yokes 3-1 and 3-3 that are of the type A, and FIG. 6 is a perspective view of the outer yokes 3-2 and 3-4 that are of the type B. As can be seen from FIGS. 5 and 6, the uppermost outer-side projecting portions 23a-1 and 23a-3 in FIG. 5 are exposed outward. On the other hand, the uppermost outer-side projecting portions 23a-2 and 23a-4 in FIG. 6 are located at not the position exposed outward but the position on the inward side, and the outer-side projecting portions 23 are arranged while deviated from each other by the half pitch in the axial direction. Because the center yoke 2 oscillates in the axial direction, the outer yoke 3 includes the outer-side projecting portions 23a that are deviated from each other by the half pitch in the axial direction in order to prevent the cogging from being generated in response to the oscillation of the center yoke 2.

In the outer yoke 3, as illustrated in FIGS. 2 and 3, the permanent magnet 24 extending in the axial direction is arranged in the groove portion 22. The permanent magnet 24 is arranged so as to be opposed to the permanent magnet 10 of the center yoke 2, and the permanent magnet 24 is magnetized such that the magnetic polarities of the permanent magnet 24 are opposite to those of the permanent magnet 10 in the circumferential direction. The outer yoke 3 also includes a winding portion 25 wound around the non-magnetic material portion 21. The non-magnetic material portion 21 may be filled with a non-magnetic material such as a synthetic resin after the winding portion 25 is formed.

For example, the center core 11 and the center-side projecting portion 11a of the center yoke 2 are produced by integral molding, and the outer core 23 and the outer-side projecting portion 23a of the outer yoke 3 are produced by integral molding. The permanent magnet 10 is bonded to the center core 11, and the permanent magnet 24 is bonded to the outer core 23. Alternatively, depending on a material for the center core 11 or the outer core 23, the permanent magnet 10 and the center core 11 may be formed by insert molding or outsert molding, and the permanent magnet 24 and the outer core 23 may be formed by insert molding or outsert molding.

Figure 7:
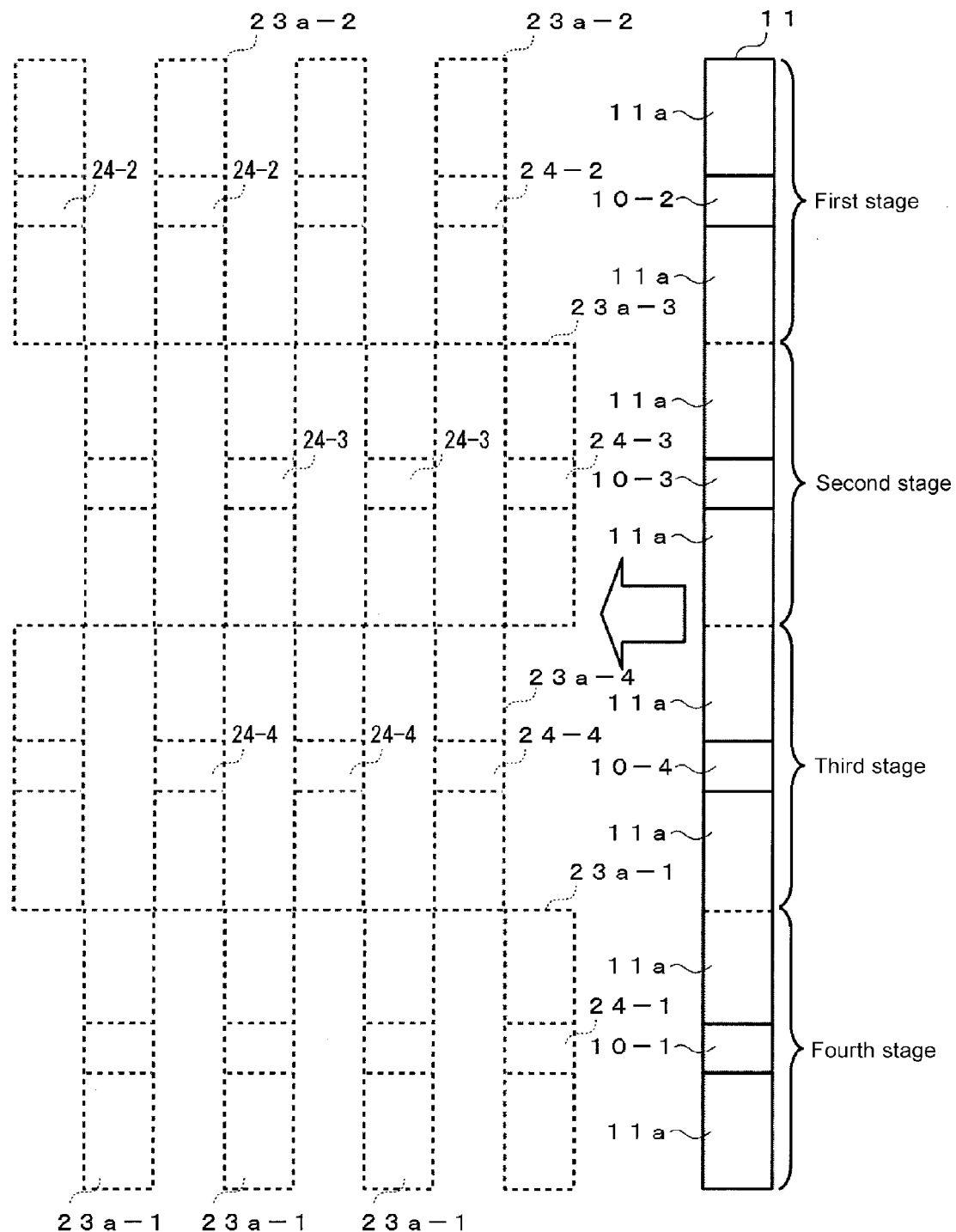
FIG. 7 is a view illustrating a correspondence relationship between a center-side projecting portion and an outer-side projecting portion.

FIG. 7 schematically illustrates a state (solid line) in which one of the center-side projecting portions 11a of the center yoke 2 is expanded in the circumferential direction from a dividing point between the outer yokes 3-1 and 3-2 in FIG. 3 and the outer-side projecting portions 23a-1, 23a-2, 23a-3, and 23a-4 (broken line) of the outer yoke 3 opposed to the center-side projecting portion 11a. An outline arrow in FIG. 7 indicates the direction in which the center yoke 2 moves in the outer yoke 3.

Hereinafter, for the sake of convenience, the center-side projecting portion 11a will be described while divided into regions. That is, based on the state in FIG. 7, a part in which the center-side projecting portion 11a can be opposed to the outer-side projecting portion 23a-2 is referred to as a first stage of the center-side projecting portion 11a, a part in which the center-side projecting portion 11a can be opposed to the outer-side projecting portion 23a-3 is referred to as a second stage of the center-side projecting portion 11a, apart in which the center-side projecting portion 11a can be opposed to the outer-side projecting portion 23a-4 is referred to as a third stage of the center-side projecting portion 11a, and a part in which the center-side projecting portion 11a can be opposed to the outer-side projecting portion 23a-1 is referred to as a fourth stage of the center-side projecting portion 11a.

Figure 8:
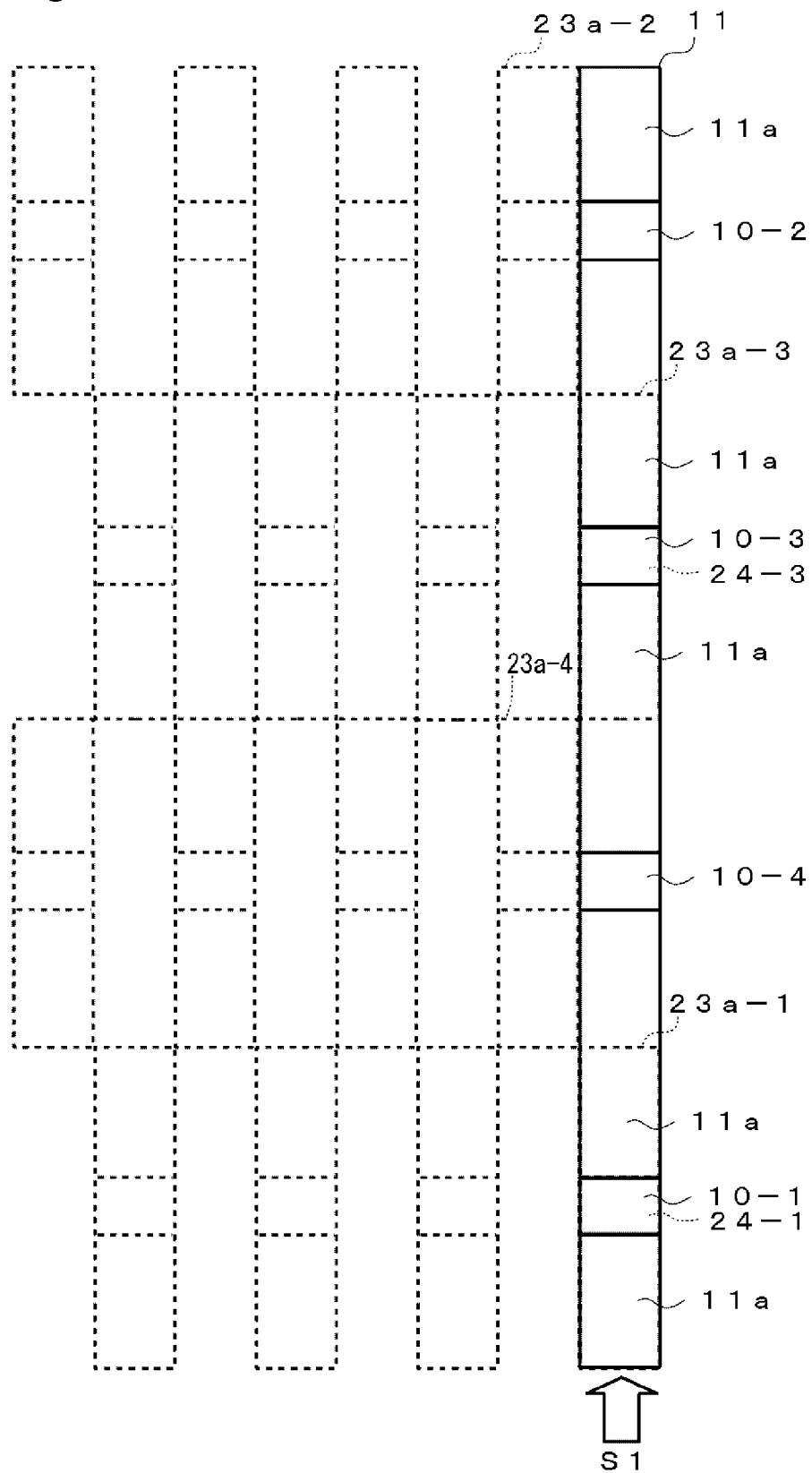
FIG. 8 is a view illustrating a state S1 in a positional relationship between the center-side projecting portion and the outer-side projecting portion.

FIG. 8 illustrates a state S1 in which the second stage of the center-side projecting portion 11a is opposed to the outer-side projecting portion 23a-3 while the fourth stage of the center-side projecting portion 11a is opposed to the outer-side projecting portion 23a-1. At this point, the outer-side projecting portions 23a-2 and 23a-4 are not opposed to the center-side projecting portion 11a.

Figure 9:
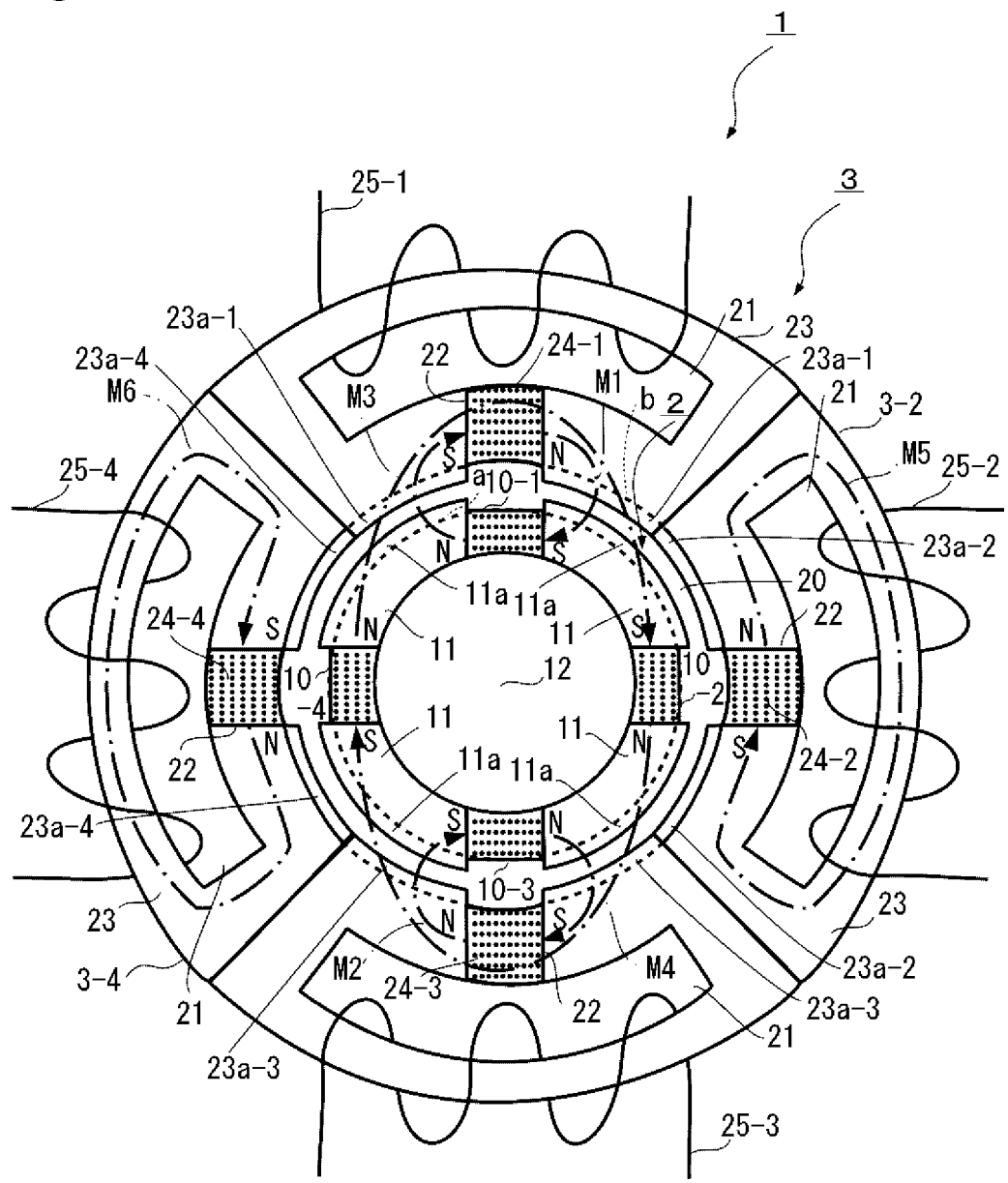
FIG. 9 is a view illustrating a state of a magnetic path generated in the linear power generator in the state S1 of FIG. 8.

In the state S1, as illustrated in FIG. 9, the attractive force is maximized between the second stage of the center-side projecting portion 11a and the outer-side projecting portion 23a-3 opposed thereto and between the fourth stage of the center-side projecting portion 11a and the outer-side projecting portion 23a-1 opposed thereto. On the other hand, in the state S1, as illustrated in FIG. 9, the attractive force is minimized between the first stage of the center-side projecting portion 11a and the outer-side projecting portion 23a-2 that is not opposed thereto and between the third stage of the center-side projecting portion 11a and the outer-side projecting portion 23a-4 that is not opposed thereto.

In the state S1, because the center-side projecting portion 11a is opposed to the outer-side projecting portions 23a-3 and 23a-1, the magnetic fluxes of the permanent magnets 10-1 and 10-3 of the center yoke 2 are easily attracted to the permanent magnets 24-1 and 24-3 of the outer yoke 3, a magnetic path M1 of an N pole of the permanent magnet 10-1→an S pole of the permanent magnet 24-1→an N pole of the permanent magnet 24-1→an S pole of the permanent magnet 10-1 and a magnetic path M2 of an N pole of the permanent magnet 10-3→an S pole of the permanent magnet 24-3→an N pole of the permanent magnet 24-3→an S pole of the permanent magnet 10-3 are formed in a strong state. In the state S1, because the center-side projecting portion 11a near the permanent magnets 10-2 and 10-4 is not opposed to the outer-side projecting portions 23a-2 and 23a-4, the magnetic fluxes of the permanent magnets 10-2 and 10-4 of the center yoke 2 are attracted to the projecting portion that is located adjacent to the projecting portion partially opposed to the outer-side projecting portions 23a-2 and 23a-4. That is, magnetic paths M3 and M4 of the N pole of the permanent magnet 10-4→the S pole of the permanent magnet 24-1→the N pole of the permanent magnet 24-1→the S pole of the permanent magnet 10-2→the N pole of the permanent magnet 10-2→the S pole of the permanent magnet 24-3→the S pole of the permanent magnet 10-4 are formed because the magnetic fluxes of the permanent magnets 10-2 and 10-4 are attracted to the permanent magnets 24-1 and 24-3 of the outer yoke 3.

In the state S1, the outer-side projecting portions 23a-2 and 23a-4 are not opposed to the center-side projecting portion 11a, the magnetic fluxes of the permanent magnets 24-2 and 24-4 located in the outer yokes 3-2 and 3-4 do not go out from the outer yokes 3-2 and 3-4, but form a magnetic path M5 passing through the winding portion 25-2 and a magnetic path M6 passing through the winding portion 25-4.

When attention is paid to the magnetic flux densities involved in the winding portions 25-1 and 25-3 in the state S1, the magnetic flux densities involved in the winding portions 25-1 and 25-3 are minimized because the magnetic fluxes are attracted onto the side of the center yoke 2. On the other hand, when attention is paid to the magnetic flux densities involved in the winding portions 25-2 and 25-4 in the state S1, a degree at which the magnetic fluxes go out from the outer yokes 3-2 and 3-4 is extremely decreased because of the magnetic paths M5 and M6, and the magnetic flux densities involved in the winding portions 25-2 and 25-4 are maximized.

Figure 10:
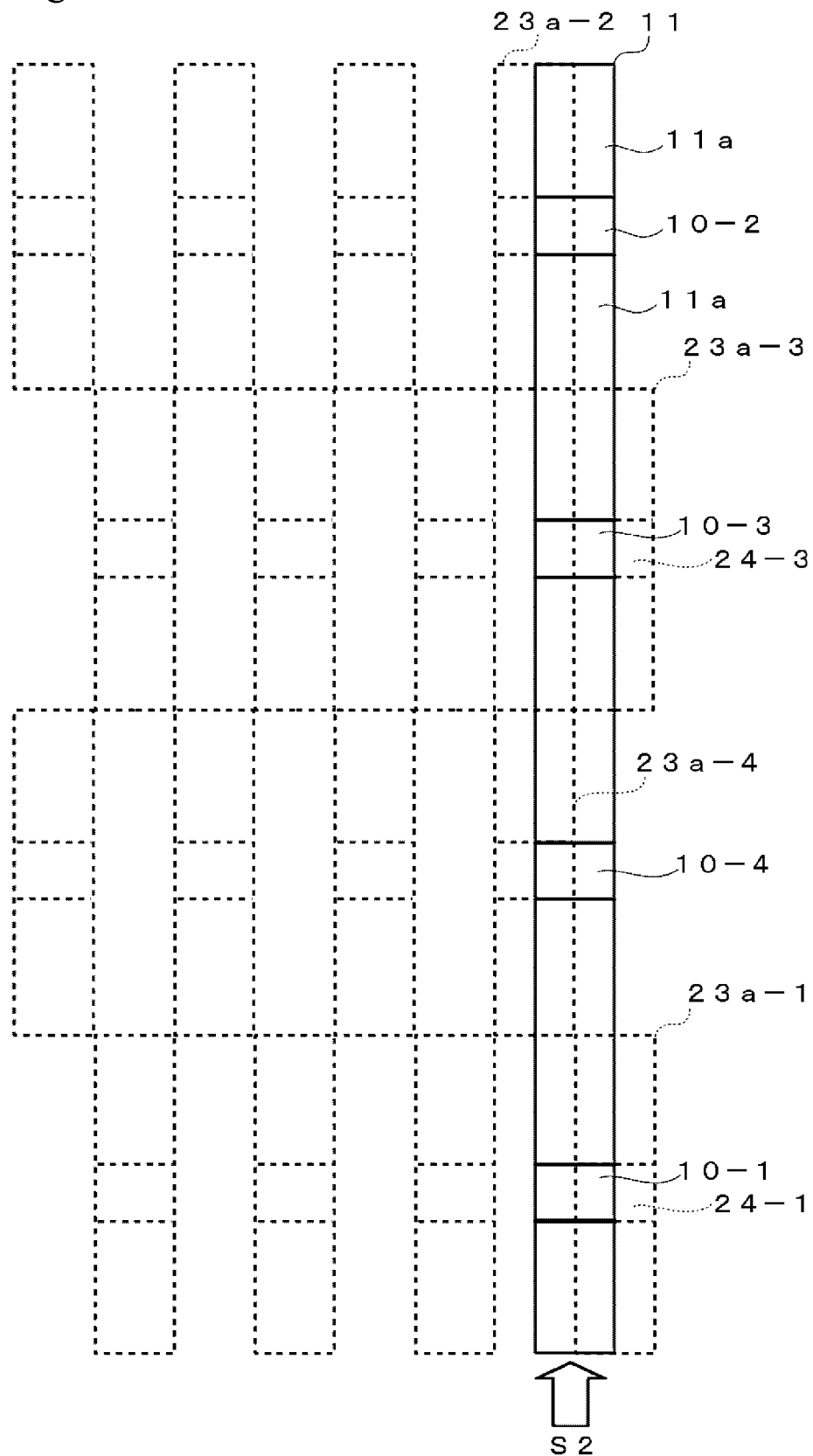
FIG. 10 is a view illustrating a state S2 in the positional relationship between the center-side projecting portion and the outer-side projecting portion.
Figure 11:
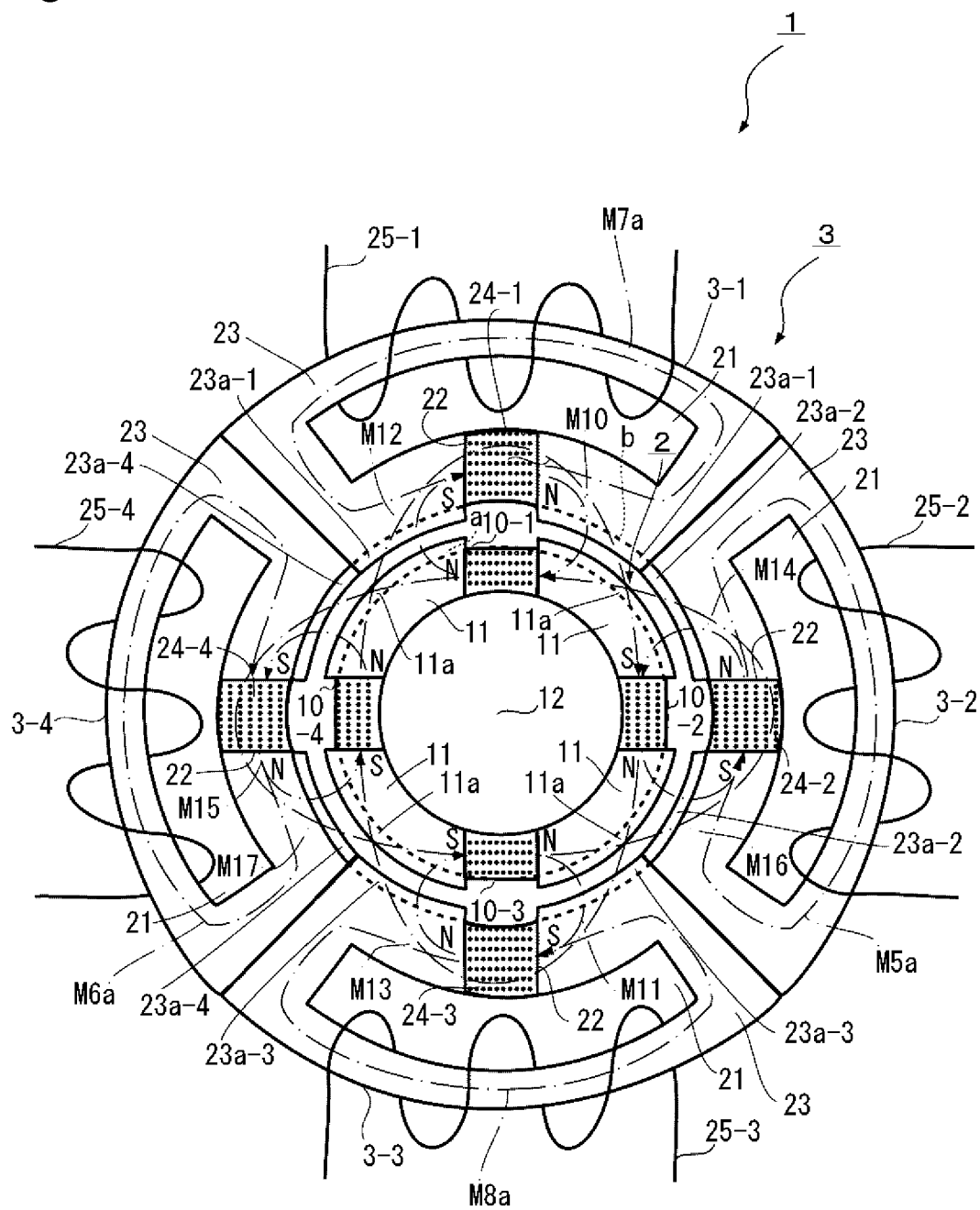
FIG. 11 is a view illustrating a state of the magnetic path generated in the linear power generator in the state S2 of FIG. 10.

In the state S2, as illustrated in FIG. 10, all the outer-side projecting portions 23a-1 to 23a-4 are evenly opposed to the center-side projecting portion 11a. However, an opposed area between the center-side projecting portion 11a and each of the outer-side projecting portions 23a-1 to 23a-4 becomes a half area in each of the outer-side projecting portions 23a-1 to 23a-4. As illustrated in FIG. 11, magnetic paths M10, M11, M12, and M13 having small magnetic fluxes are formed between the outer yokes 3-1 and 3-3 and the center yoke 2. The magnetic path M10 corresponds to the magnetic path M1 in FIG. 9, the magnetic path M11 corresponds to the magnetic path M2, the magnetic path M12 corresponds to the magnetic path M3, and the magnetic path M13 corresponds to the magnetic path M4. As illustrated in FIG. 11, the magnetic paths M14, M15, M16, and M17 having the small magnetic fluxes are formed between the outer yokes 3-2 and 3-4 and the center yoke 2. The magnetic paths M14, M15, M16, and M17 are substantially similar to the magnetic paths M10, M11, M12, and M13 in the intensity.

When attention is paid to the magnetic flux densities involved in the winding portions 25-1 to 25-4 in the state S2, the magnetic flux densities involved in the winding portions 25-1 to 25-4 become substantially equal. Therefore, the magnetic flux densities of the winding portion 25-1 and 25-3 that are maximized in the state S1 decrease and the magnetic flux densities of the winding portion 25-2 and 25-4 that are minimized in the state S1 increase. That is, the magnetic paths M5 and M6 become magnetic paths M5a and M6a having half magnetic flux densities, and magnetic paths M7a and M8a having magnetic flux densities substantially equal to those of the magnetic paths M5a and M6a are newly formed in the winding portions 25-1 and 25-3.

Figure 12:
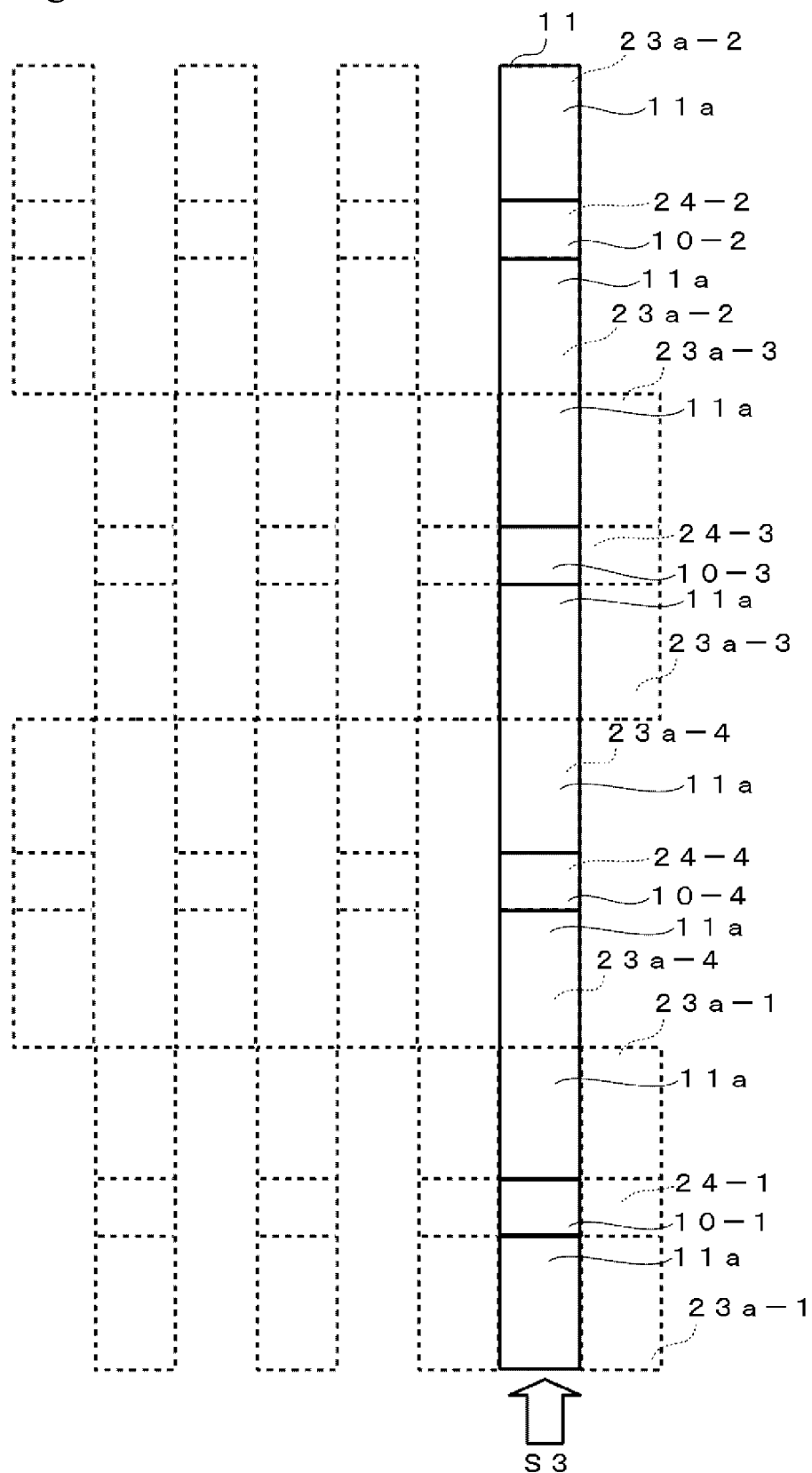
FIG. 12 is a view illustrating a state S3 in the positional relationship between the center-side projecting portion and the outer-side projecting portion.

FIG. 12 illustrates a state S3 in which the first stage of the center-side projecting portion 11a is opposed to the outer-side projecting portion 23a-2 while the third stage of the center-side projecting portion 11a is opposed to the outer-side projecting portion 23a-4. At this point, the outer-side projecting portions 23a-1 and 23a-3 are not opposed to the center-side projecting portion 11a.

Figure 13:
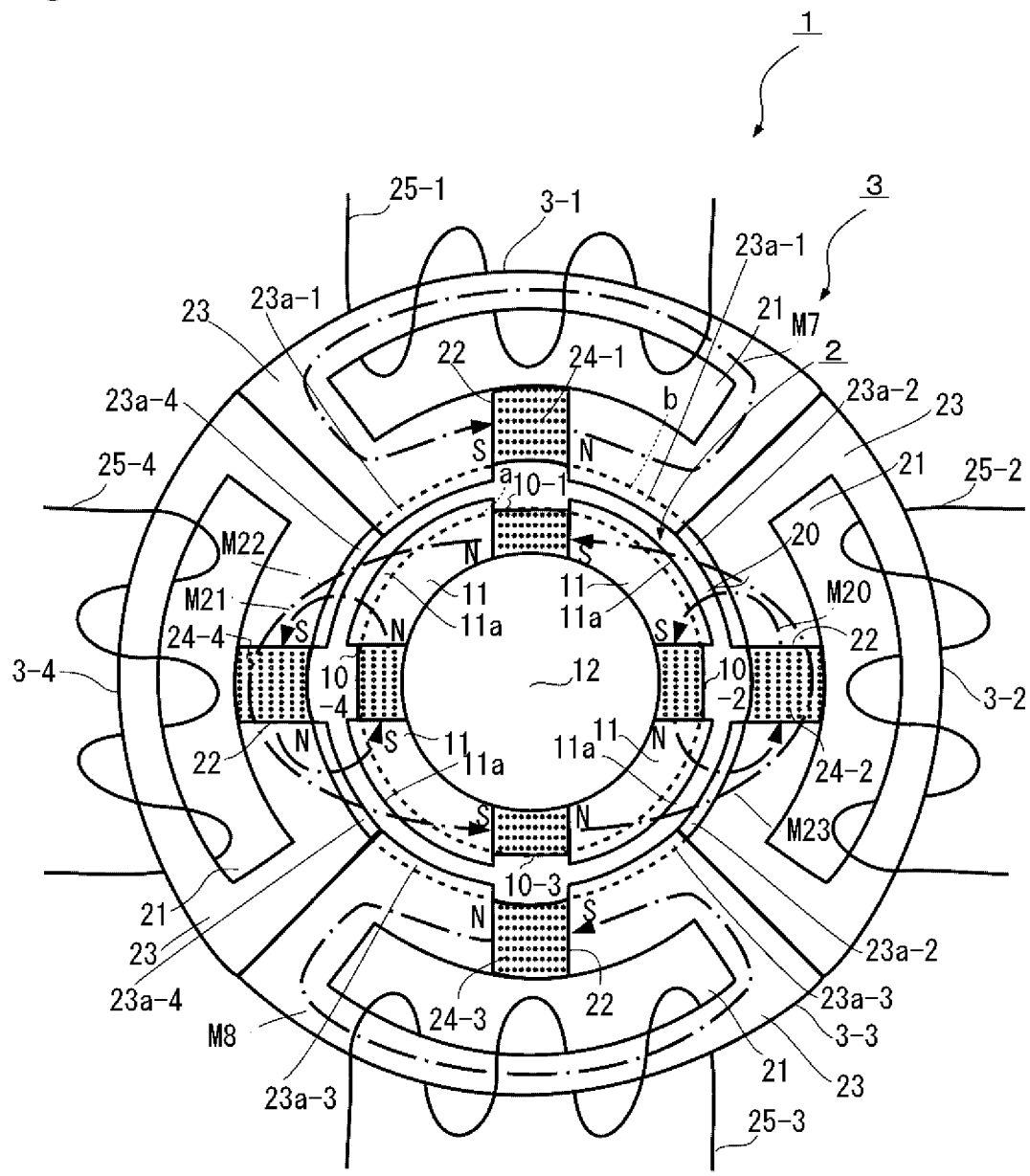
FIG. 13 is a view illustrating a state of the magnetic path generated in the linear power generator in the state S3 of FIG. 12.

In the state S3, as illustrated in FIG. 13, the attractive force is maximized between the first and the third stages of the center-side projecting portion 11a and the outer-side projecting portions 23a-2 and 23a-4 opposed thereto. Therefore, a magnetic path M14 becomes a magnetic path M20 having the strong magnetic flux density and a weak magnetic path M15 becomes a strong magnetic path M21. On the other hand, in the state S3, as illustrated in FIG. 13, the attractive force is minimized between the second and fourth stages of the center-side projecting portion 11a and the outer-side projecting portions 23a-1 and 23a-3 that are not opposed thereto. The state S3 is one in which the state S1 is rotated by 90 degrees in terms of mechanical angle. The state S3 is also one in which the state S1 is electrically progressed by 180 degrees.

When attention is paid to the magnetic flux densities involved in the winding portions 25-2 and 25-4 in the state S3, the magnetic flux densities involved in the winding portions 25-2 and 25-4 are minimized because the magnetic fluxes are attracted onto the side of the center yoke 2 (not illustrated in FIG. 13). On the other hand, when attention is paid to the magnetic flux densities involved in the winding portions 25-1 and 25-3 in the state S3, a degree at which the magnetic fluxes of the permanent magnets 24-1 and 24-3 go out from the outer yokes 3-1 and 3-3 is extremely decreased because the center-side projecting portion 11a is not opposed to the outer-side projecting portions 23a-1 and 23a-3, and the magnetic flux densities involved in the winding portions 25-1 and 25-3 are maximized. At this point, the magnetic path M7 a having the weak magnetic flux density becomes the magnetic path M7 having the strong magnetic flux density, and the magnetic path M8 a having the weak magnetic flux density becomes the magnetic path M8 having the strong magnetic flux density.

As described above with reference to FIGS. 8 to 13, when the center yoke 2 moves in the outer yoke 3 toward the direction of the outline arrow in FIG. 7 (that is, moves from right to left in FIG. 7), the magnetic flux densities of the winding portions 25-1 to 25-4 are repeatedly changed between the minimum and the maximum. Therefore, in the winding portions 25-1 to 25-4, the current is generated in the direction in which the change in magnetic flux density is prevented. Similarly the magnetic flux densities of the winding portions 25-1 to 25-4 are repeatedly changed between the minimum and the maximum when the center-side projecting portion 11a reaching a left end in FIG. 7 moves from left to right in FIG. 7. Therefore, in the winding portions 25-1 to 25-4, the current is generated in the direction in which the change in magnetic flux density is prevented. Thus, the power generator 1 can continuously generate the power by the reciprocating motion of the center yoke 2 in the outer yoke 3.

Figure 14:
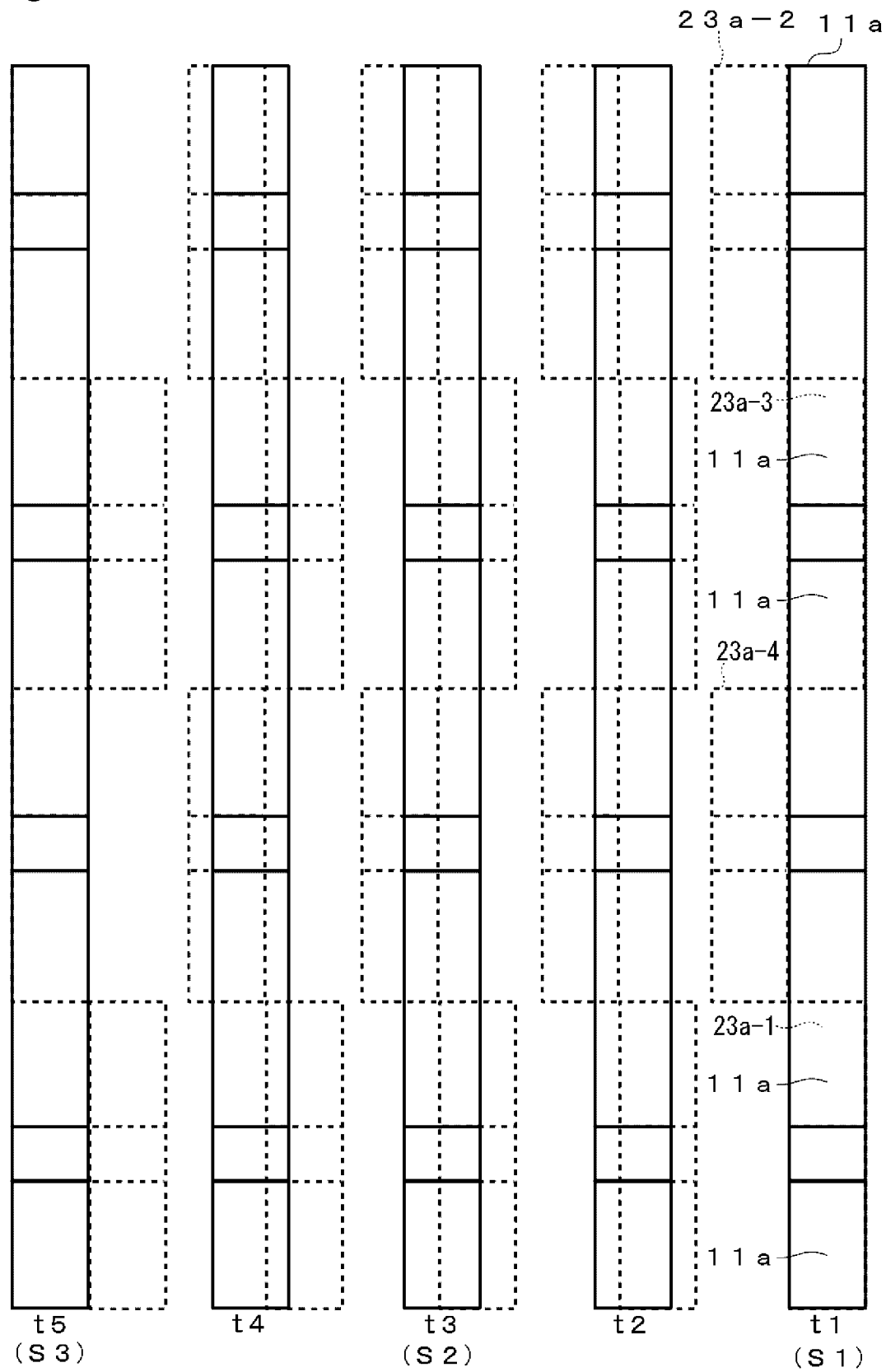
FIG. 14 is a view illustrating a change of the positional relationship between the center-side projecting portion and the outer-side projecting portion as time advances (clock times t1 to t5).
Figure 15:
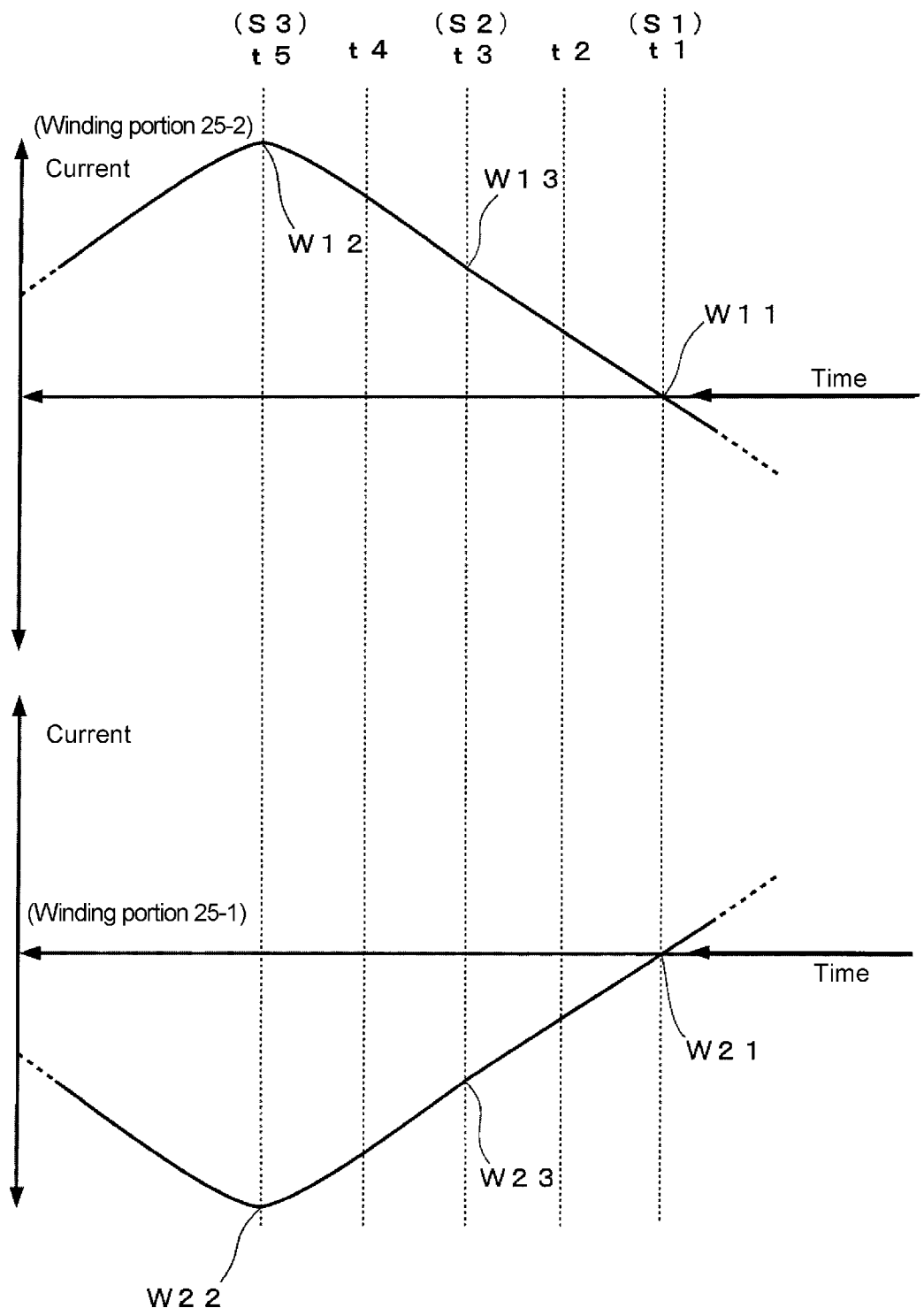
FIG. 15 is a view schematically illustrating a state in which a current is generated in a winding portion of the linear power generator as time advances (clock times t1 to t5) of FIG. 14.

FIG. 14 illustrates a positional relationship between the center-side projecting portion 11a of the center yoke 2 and the outer-side projecting portions 23a-1 to 23a-4 of the outer yoke 3 together with an elapse (clock times t1 to t5) when the state makes a transition of S1→S2→S3. FIG. 15 illustrates states of the currents generated in the winding portions 25-1 and 25-2 of the power generator 1 at each of the clock times t1 to t5 in FIG. 14. A current waveform of the winding portion 25-3 is identical to that of the winding portion 25-1, and a current waveform of the winding portion 25-4 is identical to that of the winding portion 25-2. Therefore, the description of the current waveforms of the winding portions 25-3 and 25-4 is neglected. The center yoke 2 moves in the outer yoke 3 at a constant speed as illustrated in FIG. 14, which generates sinusoidal current waveforms in the winding portions 25-1 and 25-2 as illustrated in FIG. 15.

For example, in FIG. 14, the clock time t1 corresponds to the state S1 in FIG. 9. At the clock time t1, the second stage of the center-side projecting portion 11a of the center yoke 2 is opposed to the outer-side projecting portion 23a-3 of the outer yoke 3, and the magnetic flux density around the winding portion 25-2 becomes the maximum. Then the magnetic flux density decreases. For this reason, the current generating the magnetic force line in the direction in which the decrease in magnetic flux density is prevented passes through the winding portion 25-2 in a certain direction. Assuming that a certain direction is positive, the positive current passes through the winding portion 25-2. This is indicated by a point W11 in FIG. 15. On the other hand, the magnetic flux density around the winding portion 25-1 becomes the minimum, and then the magnetic flux density increases. For this reason, the current generating the magnetic force line in the direction in which the increase in magnetic flux density is prevented passes through the winding portion 25-1. The direction of the current passage is opposite to the direction of the winding portion 25-2. This direction is negative. This is indicated by a point W21 in FIG. 15. At this point, the maximum attractive force is generated between the second stage of the center-side projecting portion 11a of the center yoke 2 and the outer-side projecting portion 23a-3 of the outer yoke 3.

As illustrated in FIG. 15, the clock time t1 becomes a midpoint of positive and negative of alternating current curves because the direction of the current passage is reversed in the winding portions 25-1 and 25-2. That is, at the clock time t1, as illustrated in FIG. 15, the positive-side current and the negative-side current are not generated in the winding portions 25-1 and 25-2 (minimum value of current=0 ampere).

In FIG. 15, the clock time t5 corresponds to the state S3 in FIG. 13. At the clock time t5, the first stage of the center-side projecting portion 11a of the center yoke 2 is opposed to the outer-side projecting portion 23a-2 of the outer yoke 3, the magnetic flux density around the winding portion 25-2 becomes the minimum. Then the magnetic flux density increases. For this reason, the current generating the magnetic force line in the direction in which the increase in magnetic flux density is prevented passes through the winding portion 25-2. This direction is positive according to the above reference. This is indicated by a point W12 in FIG. 15. On the other hand, the magnetic flux density around the winding portion 25-1 becomes the maximum, and then the magnetic flux density decreases. For this reason, the current generating the magnetic force line in the direction in which the decrease in magnetic flux density is prevented passes through the winding portion 25-1. The direction of the current passage is opposite to the direction of the winding portion 25-2. This direction is negative. This is indicated by a point W22 in FIG. 15. At this point, the maximum attractive force is generated between the first stage of the center-side projecting portion 11a of the center yoke 2 and the outer-side projecting portion 23a -2 of the outer yoke 3.

Therefore, at the clock time t5, as illustrated in FIG. 15, the current having the maximum value (W12) on the positive side is generated in the winding portion 25-2, and the current having the maximum value (W22) on the negative side is generated in the winding portion 25-1.

The clock time t3 corresponds to the state S2 in FIG. 11. At the clock time t3, a half of the center-side projecting portion 11a of the center yoke 2 is opposed to halves of the outer-side projecting portions 23a -1-to 23a-4 of the outer yoke 3. The clock time t3 is a midpoint in a process of the transition from the state S1 to the state S3. Therefore, at the clock time t3, as illustrated in FIG. 15, the current having a substantially intermediate value of the maximum value and the minimum value (=0 ampere) on the positive and negative sides is generated in each of the winding portions 25-1 and 25-2.

The clock times t1 and t2 are the process of the transition from the state S1 to the state S3, respectively. Therefore, at the clock time t2, as illustrated in FIG. 15, the current having a substantially intermediate value of the current value (0 ampere) generated in the state S1 and the current value generated in the state S2 is generated in each of the winding portions 25-1 and 25-2. At the clock time t4, as illustrated in FIG. 15, the current having a substantially intermediate value of the current value generated in the state S2 and the current value (maximum value) generated in the state S3 is generated in each of the winding portions 25-1 and 25-2. From the state s1 to the state S2 and the process of the transition Thus, the current for a quarter period in the sinusoidal current waveform generated in each of the winding portions 25-1 and 25-2 is generated at the clock times t1 to t5. That is, in the case that the center yoke 2 of the power generator 1 moves at a constant speed, one period of the sinusoidal current waveform generated in each of the winding portions 25-1 and 25-2 is ended for the time four times the clock times t1 to t5.

The same holds true for the description of the winding portions 25-1 and 25-2 even if the winding portions 25-1 and 25-2 are replaced with the winding portions 25-3 and 25-4.

The currents having the same intensity are generated in the same direction in the winding portions 25-1 and 25-3, and the currents having the same intensity are generated in the same direction, which is opposite to the direction of the winding portions 25-1 and 25-3, in the winding portions 25-2 and 25-4. Therefore, the winding portions 25-1 to 25-4 are properly connected such that the current is obtained in the same direction, and the current is output from the output terminal 4 in FIG. 1, which allows the power generator 1 to generate the power. As needed basis, the two current having the periods different from each other by 180 degrees may be taken out.

In a general linear power generator, the cogging is caused by a change of the attractive force or a repulsive force between the side of the center yoke 2 and the side of the outer yoke 3 depending on the position of the center yoke. On the other hand, in the power generator 1, the opposed area between the projecting portions does not change at any one of the clock times t1 to t5. Irrespective of the positional relationship between the center yoke 2 and the outer yoke 3, the opposed area between the center-side projecting portion 11a of the center yoke 2 and the outer-side projecting portions 23a-1 to 23a-4 of the outer yoke 3 is kept constant, and the opposed area between the center-side projecting portion 11a and the portion that does not project in the outer yoke 3 is kept constant. Therefore, the attractive force between the center yoke 2 and the outer yoke 3 is kept constant.

For example, at the clock time t1 (state S1), the second and fourth stages of the center-side projecting portion 11a of the center yoke 2 and the outer-side projecting portions 23a-3 and 23a-1 of the outer yoke 3 are opposed to each other with the maximum areas of the outer-side projecting portions 23a-1 and 23a-3, and attracted to each other with the maximum attractive forces. On the other hand, the outer-side projecting portions 23a-2 and 23a-4 of the outer yoke 3 is opposed to no part of the center-side projecting portion 11a of the center yoke 2, and the attractive force is the minimum. Therefore, it can be considered that the intensity of the attractive force between the center-side projecting portion 11a of the center yoke 2 and the outer-side projecting portions 23a-1 to 23a-4 of the outer yoke 3 depends on a summation of the intensity of the attractive force in the opposed area part and the intensity of the attractive force in the non-opposed area part between the center-side projecting portion 11a of the center yoke 2 and the outer-side projecting portions 23a-1 to 23a-4 of the outer yoke 3.

Assuming that Q cm$^2$ (square centimeter) is the maximum value of the area when the outer-side projecting portions 23a-1 to 23a-4 of the outer yoke 3 are opposed to the center-side projecting portion 11a of the center yoke 2, and that P1 is the intensity of the attractive force per 1 cm$^2$, at the clock time t1, the opposed area between the second stage of the center-side projecting portion 11a of the center yoke 2 and the outer-side projecting portion 23a-3 of the outer yoke 3 becomes Q cm$^2$, and the attractive force becomes Q×P1. The opposed area between the fourth stage of the center-side projecting portion 11a of the center yoke 2 and the outer-side projecting portion 23a-1 of the outer yoke 3 becomes Q cm², and the attractive force becomes Q×P1. Each of the non-opposed area between the first stage of the center-side projecting portion 11a of the center yoke 2 and the outer-side projecting portion 23a-2 of the outer yoke 3 and the non-opposed area between the third stage of the center-side projecting portion 11a of the center yoke 2 and the outer-side projecting portion 23a-4 of the outer yoke 3 becomes Q cm², and the attractive force becomes Q×P2 where P2 is the intensity of the attractive force per 1 cm² in the non-opposed area part. Therefore, the attractive force of each of the projecting portions 11a and 23a-1 to 23a-4 between the center yoke 2 and the outer yoke 3 is "2Q×P1+2Q×P2=2Q(P1+P2)" at the clock time t1.

At the clock time t2, a quarter in the circumferential direction of each of the first and third stages of the center-side projecting portion 11a of the center yoke 2 and a quarter in the circumferential direction of each of outer-side projecting portions 23a-2 and 23a-4 of the outer yoke 3 are opposed to each other, and three quarters of each of the second and fourth stages of the center-side projecting portion 11a of the center yoke 2 and three quarters in the circumferential direction of each of the outer-side projecting portions 23a-3 and 23a-1 of the outer yoke 3 are attracted to each other while opposed to each other.

The opposed area between each of the first and third stages of the center-side projecting portion 11a of the center yoke 2 and each of the outer-side projecting portions 23a-2 and 23a-4 of the outer yoke 3 is (¼)Q cm², and the opposed area between each of the second and fourth stages of the center-side projecting portion 11a of the center yoke 2 and each of the outer-side projecting portions 23a-3 and 23a-1 of the outer yoke 3 is (¾)Q cm². Therefore, at the clock time t2, the summation of the attractive forces in the parts opposed to the projecting portions 11a and 23a-1 to 23a-4 between the center yoke 2 and the outer yoke 3 is obtained as follows.

$$(1/4)Q \text{ cm}^2 \times P1 + (1/4)Q \text{ cm}^2 \times P1 + (3/4)Q \text{ cm}^2 \times P1 +$$
$$(3/4)Q \text{ cm}^2 \times P1 = (8/4)Q \text{ cm}^2 \times P1 = 2Q \text{ cm}^2 \times P1$$

On the other hand, the attractive force in the non-opposed area part becomes 2Q cm²×P2 by the similar calculation. Accordingly, at the clock time t2, the attractive force becomes "2Q×P1+2Q×P2=2Q(P1+P2)" similarly to the clock time t1.

At the clock time t3, a half in the circumferential direction of the center-side projecting portion 11a of the center yoke 2 and a half in the circumferential direction of each of outer-side projecting portions 23a-1 to 23a-4 of the outer yoke 3 are strongly attracted to each other while opposed to each other.

At this point, the opposed area between the center-side projecting portion 11a of the center yoke 2 and each of the outer-side projecting portions 23a-1 to 23a-4 of the outer yoke 3 is (½)Q cm². Therefore, at the clock time t3, the summation of the attractive forces in the parts opposed to the projecting portions 11a and 23a-1 to 23a-4 between the center yoke 2 and the outer yoke 3 is obtained as follows.

(½)Q cm²×P1+(½)Q cm²×P1+(½)Q cm²×P1+(½)Q cm²×P1=(4/2)Q cm²×P1=2Q cm²×P1

On the other hand, the areas of the non-opposed part, namely, the part that is not the outer-side projecting portions 23a-1 to 23a-4 of the outer yoke 3 and the part opposed to the center-side projecting portion 11a of the center yoke 2 are 2Q cm², therefore, the attractive force between the non-opposed part and the part opposed to the center-side projecting portion 11a of the center yoke 2 becomes 2Q cm²×P2. Accordingly, at the clock time t3, the summation of the attractive forces becomes 2Q (P1+P2) similarly to the clock times t1 and t2.

At the clock time t4, three quarters in the circumferential direction of each of the first and third stages of the center-side projecting portion 11a of the center yoke 2 and three quarters of each of the outer-side projecting portions 23a-2 and 23a-4 of the outer yoke 3 are opposed to each other, and a quarter in the circumferential direction of each of the second and fourth stages of the center-side projecting portion 11a of the center yoke 2 and a quarter in the circumferential direction of each of outer-side projecting portions 23a-3 and 23a-1 of the outer yoke 3 are strongly attracted to each other while opposed to each other.

The opposed area between each of the first and third stages of the center-side projecting portion 11a of the center yoke 2 and each of the outer-side projecting portions 23a-2 and 23a-4 of the outer yoke 3 is (¾)Q cm², and the opposed area between each of the second and fourth stages of the center-side projecting portion 11a of the center yoke 2 and each of the outer-side projecting portions 23a-3 and 23a-1 of the outer yoke 3 is (¼)Q cm². Therefore, at the clock time t4, the summation of the areas in the parts completely opposed to the projecting portions 11a and 23a-1 to 23a-4 between the center yoke 2 and the outer yoke 3 is obtained as follows.

$$(3/4)Q \text{ cm}^2 + (3/4)Q \text{ cm}^2 + (1/4)Q \text{ cm}^2 + (1/4)Q \text{ cm}^2 =$$
$$(8/4)Q \text{ cm}^2 = 2Q \text{ cm}^2$$

Accordingly, the attractive force caused by the opposition between the projecting portions becomes "2Q×P1". On the other hand, the area in the non-opposed part in which the center-side projecting portion 11a of the center yoke 2 is not opposed to each of the outer-side projecting portions 23a-1 to 23a-4 of the outer yoke 3 is 2Q cm², and the whole attractive force becomes "2Q (P1+P2)" similarly to the clock times t1, t2, and t3.

At the clock time t5 (state S3), although the first and third stages of the center-side projecting portion 11a of the center yoke 2 and the outer-side projecting portions 23a-2 and 23a-4 of the outer yoke 3 are strongly attracted to each other while opposed to each other, the outer-side projecting portions 23a-3 and 23a-1 of the outer yoke 3 are not opposed to the center-side projecting portion 11a of the center yoke 2. At this point, the opposed area between the each of the first and third stages of the center-side projecting portion 11a of the center yoke 2 and each of the outer-side projecting portions 23a-2 and 23a-4 of the outer yoke 3 is Q cm². Therefore, at the clock time t5, the summation of the areas in the parts completely opposed to the projecting portions 11a and 23a-1 to 23a-4 between the center yoke 2 and the outer yoke 3 is obtained as follows.

Q cm²+Q cm²=2Q cm²

Accordingly, the attractive force caused by the opposition between the projecting portions becomes "2Q×P1". On the other hand, the area in the non-opposed part in which the second and fourth stages of the center-side projecting portion 11a of the center yoke 2 are not opposed to the outer-side projecting portions 23a-3 and 23a-1 of the outer yoke 3 is 2Q cm², and the whole attractive force becomes "2Q(P1+P2)" similarly to the clock times t1, t2, t3 and t4.

Thus, the summation of the attractive forces in the projecting portions 11a and 23a-1 to 23a-4 between the center yoke 2 and the outer yoke 3 is constant "2Q cm²×(P1+P2)" at any one of the clock times t1 to t5 in FIG. 14. The current waveform generated at the clock times t1 to t5 is the current waveform for a quarter period in the sinusoidal current waveform generated in each of the winding portions 25-1 to 25-4, the sinusoidal wave are continued while the positive and negative directions of the current waveform for the quarter period are changed. Accordingly, the attractive force between the center-side projecting portion 11a of the center yoke 2 and the outer-side projecting portions 23a-1 to 23a-4 of the outer yoke 3 is kept constant in any region of the sinusoidal current waveform generated in each of the winding portions 25-1 to 25-4. This means that the attractive force between the center yoke 2 and the outer yoke 3 is kept constant irrespective of the positional relationship between the center yoke 2 and the outer yoke 3. Therefore, it is found that the cogging is not generated in the power generator 1.

In the power generator 1 in which the cogging is not generated, the power can be efficiently generated because the reciprocating motion (oscillation) externally applied to the center yoke 2 is not decreased by the cogging torque, but mostly used as a torque for the power generation.

(Other Embodiments)

Various changes of the above embodiment can be made without departing from the scope of the embodiment. For example, the hollow portion 12 and the non-magnetic material portion 21 are not formed into the hollow shape, but may be filled with a non-magnetic material such as aluminum and a resin material. In the above embodiment, each of the projecting portions 11a and 23a-1 to 23a-4 and the main bodies of the center yoke 2 and the outer yoke 3 are integrally molded. Alternatively, each of the projecting portions 11a and 23a-1 to 23a-4 is not integrally molded, but may be fixed to each main body by bonding while separately formed.

In the above embodiment, the outer-side projecting portions 23a-1 and 23a-3 of the outer yoke 3 and the outer-side projecting portions 23a-2 and 23a-4 are deviated from each other by a half pitch in the axial direction. Alternatively, the center-side projecting portion 11a of the center yoke 2 may be deviated by a half pitch in the axial direction in relation to the permanent magnet 10, and the deviation of the pitch may be eliminated in the outer-side projecting portions 23a-1 to 23a-4 of the outer yoke 3. Even in this case, the operation and advantageous effect similar to those of the above embodiment can be achieved.

The length in the axial direction of the center yoke 2 is not limited to the length in FIG. 4, and the length in the axial direction of the outer yoke 3 is not limited to the length in FIGS. 5 and 6. That is, the power generator 1 can be constructed by the center yoke 2 and outer yoke 3 having the minimum lengths in the axial direction as long as one of the center-side projecting portion 11a of the center yoke 2 and the outer-side projecting portion 23a of the outer yoke 3 is formed by one stage while the other is formed by two stages with the deviation of the half pitch.

Plural sets of winding portions 25-1 to 25-4 may be provided in parallel in the axial direction. That is, as described above, one set of winding portions 25-1 to 25-4 is provided with respect to the minimum length in the axial direction of the power generator 1. Alternatively, the plural sets of winding portions 25-1 to 25-4 may be stacked. This enables a power generation amount to be changed according to the number of stages (length).

In the above embodiment, the center yoke 2 performs the reciprocating motion (oscillation) in the power generator 1. Alternatively, the outer yoke 3 may perform the reciprocating motion while the center yoke 2 is fixed. Preferably the center yoke 2 and the outer yoke 3 are made of a soft magnetic material. Alternatively, the center yoke 2 and the outer yoke 3 may be made of a simple magnetic material. The groove portion 22 is not formed when the outer core 23 and the permanent magnet 24 are integrally molded by the insert molding. The corresponding part including the case that the outer core 23 and the permanent magnet 24 are integrally molded by the insert molding is referred to as a groove portion.

Figure 16:
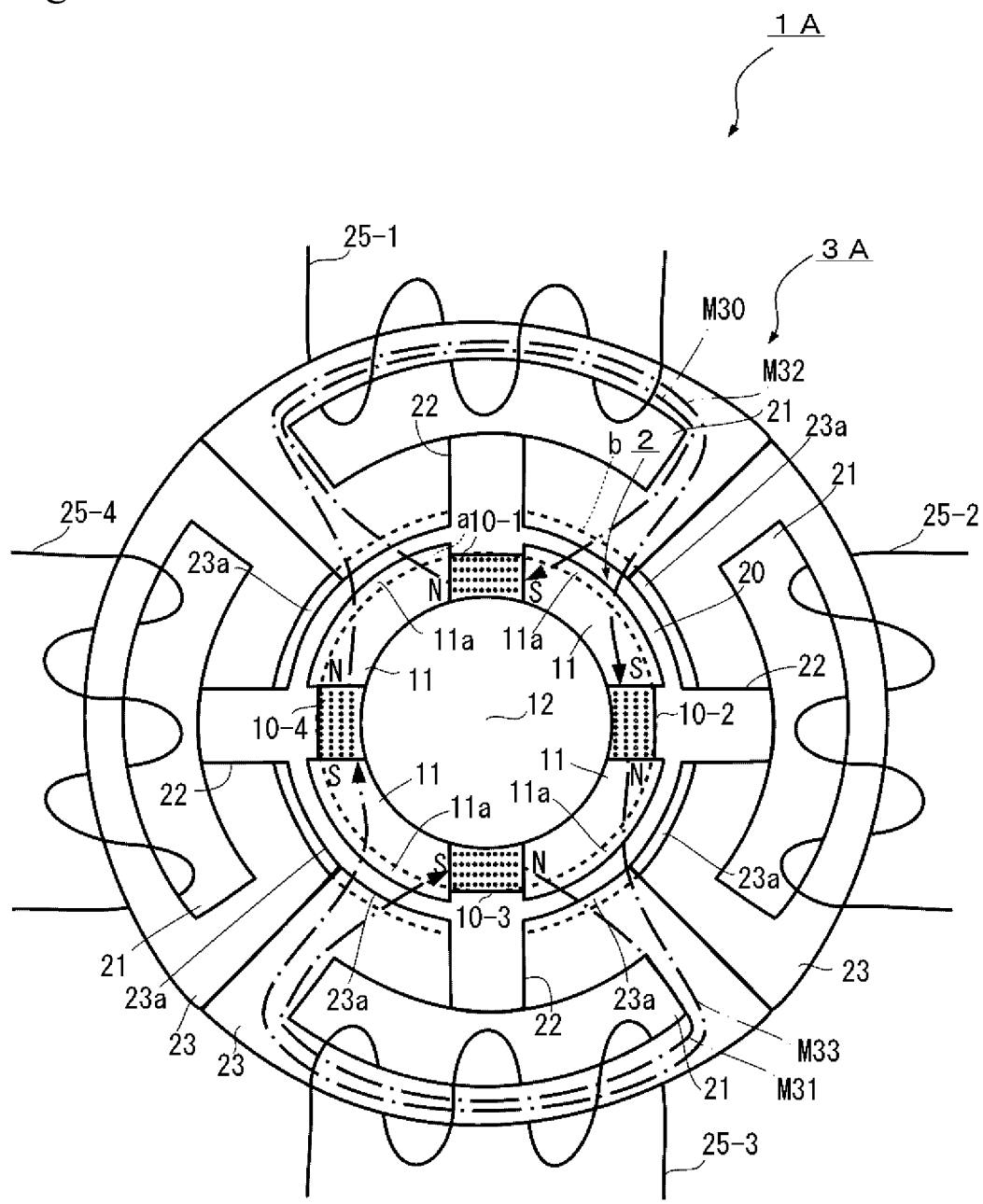
FIG. 16 is a view illustrating a configuration of a linear power generator according to another embodiment and a state of the magnetic path generated in the linear power generator in the state S1.

As illustrated in FIG. 16, a power generator 1A in which the outer yoke 3A does not include the permanent magnet may be constructed. In the power generator 1A, the groove portion 22 in which the permanent magnet 24 is removed from the outer yoke 3 of the power generator 1 is used as a non-magnetic material portion. A space where the permanent magnet 24 is removed from the outer yoke 3 may be filled with a resin or aluminum that is of the non-magnetic material. The power generator 1A operates similarly to the power generator 1 of the above embodiment. However, because the outer yoke 3A does not include the permanent magnet, the current waveforms in FIG. 15 are inverted in the winding portions 25-1 and 25-2.

For example, the state in FIG. 16 corresponds to the state S1 in FIG. 9 in the power generator 1. In the power generator 1, for the state S1 in FIG. 9, because outer yoke 3-1 includes the permanent magnet 24-1, the magnetic flux of the permanent magnet 24-1 is attracted to the side of the center yoke 2, and the magnetic flux density passing through the winding portion 25-1 is minimized. In the power generator 1A, a magnetic path M30, through which the magnetic flux from the permanent magnet 10-1 enters the side of the outer yoke 3-1 through the outer-side projecting portion 23a-1 opposed to the magnetic flux of the permanent magnet 10-1 of the center yoke 2, is formed because the outer yoke 3-1 does not include the permanent magnet. Therefore, the magnetic flux density around the winding portion 25-1 is maximized. Similarly, a magnetic path M31 is formed by the magnetic flux from the permanent magnet 10-3. Additionally, magnetic paths M32 and M33 are formed by the magnetic fluxes from the permanent magnets 10-2 and 10-4.

Thus, it is found that the maximum and minimum states of the magnetic flux density in the winding portion 25-1 are inverted when the power generator 1 and the power generator 1A are compared to each other. The same holds true for the winding portions 25-2 to 25-4. Therefore, in the power generator 1 and the power generator 1A, the current waveform in FIG. 15 is inverted.

Figure 17:
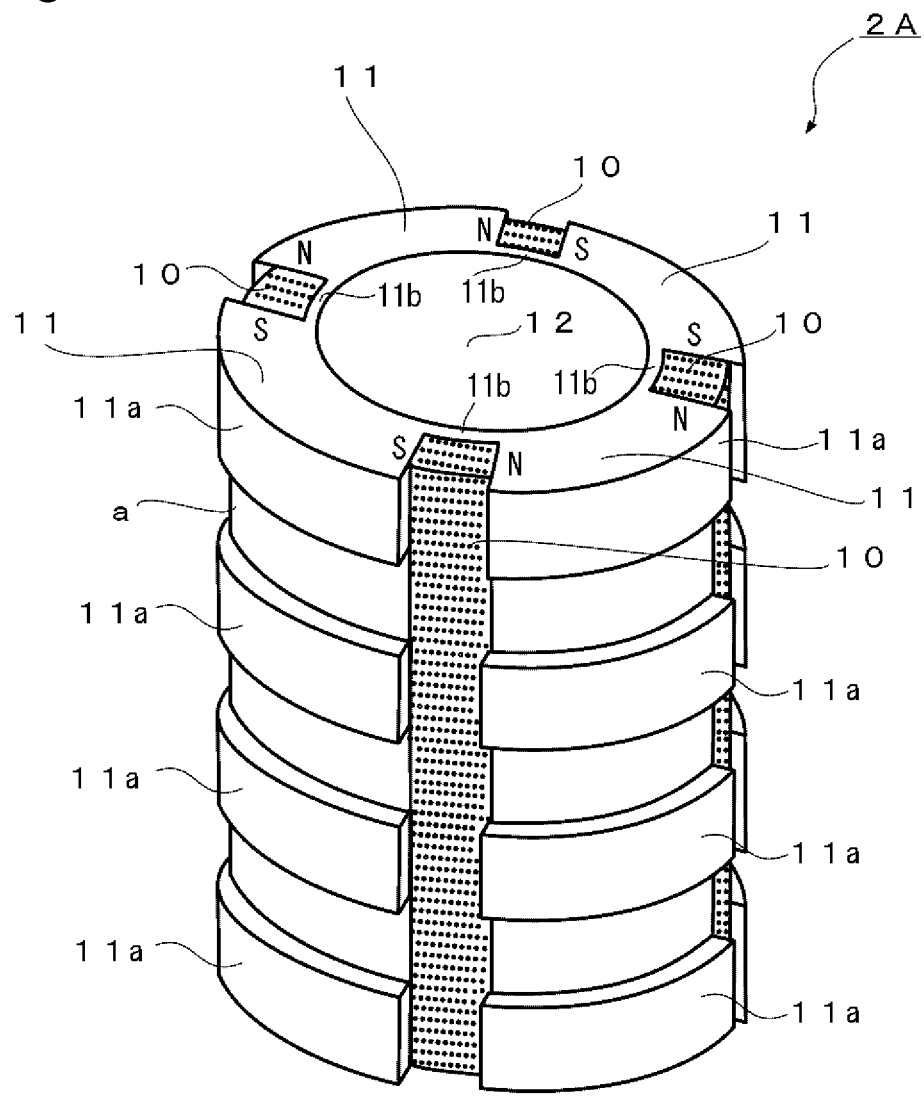
FIG. 17 is a view illustrating a configuration of the center yoke of another embodiment.

In the center yoke 2, as illustrated in FIG. 17, a connection portion 11b connecting the center cores 11 adjacent to each other may be provided in a part into which the permanent magnet 10 intrudes. Similarly, a connection portion connecting the outer cores 23 may be provided in the groove portion 22 of the outer yoke 3. In the above embodiment, the permanent magnets 10 and 24 are arranged at equal intervals, respectively. Because the magnets are preferably arranged so as to be opposed to each other, the permanent magnets 10 and 24 may be arranged at unequal intervals, respectively, and the permanent magnet 10 and the permanent magnet 24 may be opposed to each other. Although preferably the permanent magnet 10 and the permanent magnet 24 are arranged so as to be completely opposed to each other, the permanent magnet 10 and the permanent magnet 24 may be arranged so as to be slightly deviated from each other.

The inner type power generator in which the center yoke 2 moves relatively in the outer yoke 3 including the winding portion 25 is described in the above embodiments. An outer type power generator in which a part including the winding portion 25 is located on the inner side may be used. In this case, the center yoke 2 moves relatively on the outside of the outer yoke 3. In the above embodiments, one winding portion 25 is arranged in each one non-magnetic material portion 21. Alternatively, a proper number of winding portions 25 may be arranged in each non-magnetic material portion 21. For example, in the power generator 1 of the first embodiment, only one winding portion 25-1 may be arranged, only two winding portions 25-1 and 25-3, or only two winding portions 25-1 and 25-2 may be arranged. Two winding portions may be provided in one non-magnetic material portion 21.

REFERENCE SIGNS LIST

1, 1A power generator
2 center yoke
3 outer yoke
4 output terminal
10,24 permanent magnet
11 center core
11a center-side projecting portion
12 hollow portion
21 non-magnetic material portion
22 groove portion
23 outer core
23a outer-side projecting portion
25 winding portion

The invention claimed is:

1. A linear power generator comprising:
a columnar or cylindrical center yoke that is made of a soft magnetic material, a plurality of rod-shaped permanent magnets magnetized in a circumferential direction being arranged in the circumferential direction in an outer circumference of the columnar or cylindrical center yoke such that opposed magnetic poles of the permanent magnets adjacent to each other become identical, the permanent magnets being extended in an axial direction, the center yoke including a plurality of center-side projecting portions linearly arranged in the circumferential direction; and
a cylindrical or columnar outer yoke that is made of a soft magnetic material, the outer yoke including a plurality of winding portions that are arranged in the circumferential direction about a center axis, a plurality of groove portions that are arranged at positions opposed to the permanent magnets, and a plurality of outer-side projecting portions that are arranged opposed to the center-side projecting portions, the outer-side projecting portions being deviated from the center-side projecting portions by a half pitch, the groove portions being pinched by the outer-side projecting portions in the circumferential direction.

2. The linear power generator according to claim 1, wherein a permanent magnet is arranged in each of the groove portions along the axial direction, and magnetized so as to have a polarity opposite to the opposed permanent magnet of the center yoke.

3. A linear power generator comprising:
a columnar or cylindrical center yoke, a plurality of rod-shaped permanent magnets magnetized in a circumferential direction being arranged in the circumferential direction in an outer circumference of the columnar or cylindrical center yoke such that opposed magnetic poles of the permanent magnets adjacent to each other become identical, the permanent magnets being extended in an axial direction, the center yoke including a plurality of center-side projecting portions arranged in the circumferential direction, mounting positions of the center-side projecting portions between which the permanent magnets are sandwiched being deviated from each other in the axial direction by a half pitch; and
a cylindrical or columnar outer yoke including a plurality of winding portions that are arranged in the circumferential direction about a center axis, a plurality of groove portions that are arranged at positions opposed to the permanent magnets, and a plurality of outer-side projecting portions that are linearly arranged in the circumferential direction while opposed to the center-side projecting portions, the groove portions being pinched by the outer-side projecting portions in the circumferential direction.

4. The linear power generator according to claim 3, wherein a permanent magnet is arranged in each of the groove portions along the axial direction, and magnetized so as to have a polarity opposite to the opposed permanent magnet of the center yoke.

* * * * *